US011249267B2

(12) United States Patent
Van Baelen et al.

(10) Patent No.: US 11,249,267 B2
(45) Date of Patent: Feb. 15, 2022

(54) OPTICAL AND POWER NETWORK FOR MODULAR EQUIPMENT

(71) Applicant: COMMSCOPE CONNECTIVITY BELGIUM BVBA, Kessel-Lo (BE)

(72) Inventors: David Jan Irma Van Baelen, Winksele (BE); Rudy Musschebroeck, Wemmel (BE); Joshua M. Simer, Chaska, MN (US)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 16/349,939

(22) PCT Filed: Nov. 14, 2017

(86) PCT No.: PCT/EP2017/079160
§ 371 (c)(1),
(2) Date: May 14, 2019

(87) PCT Pub. No.: WO2018/091449
PCT Pub. Date: May 24, 2018

(65) Prior Publication Data
US 2019/0331871 A1    Oct. 31, 2019

Related U.S. Application Data

(60) Provisional application No. 62/422,433, filed on Nov. 15, 2016.

(51) Int. Cl.
*G02B 6/44* (2006.01)
*G02B 6/28* (2006.01)
(Continued)

(52) U.S. Cl.
CPC ............. *G02B 6/4439* (2013.01); *G02B 6/28* (2013.01); *H04B 10/25* (2013.01); *H04N 5/2252* (2013.01)

(58) Field of Classification Search
CPC ......... G02B 6/4439; G02B 6/28; H04B 10/25
(Continued)

(56) References Cited

U.S. PATENT DOCUMENTS 6,256,443 B1 *   7/2001   Uruno ................... G02B 6/4452
                                                          385/134
7,102,884 B2 *   9/2006   Mertesdorf .......... G02B 6/4452
                                                          361/679.4
(Continued)

FOREIGN PATENT DOCUMENTS

JP       H07-37441 A      2/1995
WO    2008/157574 A2    12/2008
(Continued)

OTHER PUBLICATIONS

International Search Report and Written Opinion of the International Searching Authority for International Patent Application No. PCT/EP2017/079160 dated Feb. 28, 2018, 15 pages.

(Continued)

*Primary Examiner* — Kaveh C Kianni
(74) *Attorney, Agent, or Firm* — Merchant & Gould P.C.

(57) ABSTRACT

A wireless network includes connections stations (110, 120, 140) disposed along a distribution cable (101) that carries optical signals and power. Each connection station (110, 120, 140) has a port (115) at which the optical signals and power of the cable (101) are provided. A wireless module (150, 160, 170) can be mounted at a connection station (110) so that a connection arrangement of the wireless module (150, 160, 170) plugs into the port. The wireless module (150, 160, 170) can obtain power from the distribution cable (101) via the connection station (110, 120, 140). The wireless module (150, 160, 170) can broadcast the signals carried by the distribution cable (101) to the surrounding area.

19 Claims, 21 Drawing Sheets

(51) Int. Cl.
*H04B 10/25* (2013.01)
*H04N 5/225* (2006.01)

(58) Field of Classification Search
USPC .......................................................... 385/24
See application file for complete search history.

(56) References Cited

U.S. PATENT DOCUMENTS

| | | | |
|---|---|---|---|
| 7,203,404 B2 | 4/2007 | Greenwood et al. | |
| 7,228,036 B2 | 6/2007 | Elkins, II et al. | |
| 7,277,614 B2 | 10/2007 | Cody et al. | |
| 7,729,583 B2 | 6/2010 | Elkins, II et al. | |
| 9,438,513 B2 * | 9/2016 | Gronvall | H04Q 11/0067 |
| 10,031,305 B2 | 7/2018 | Leeman et al. | |
| 2006/0185878 A1 * | 8/2006 | Soffer | H02G 3/121 |
| | | | 174/50 |
| 2009/0097855 A1 * | 4/2009 | Thelen | H04B 10/25752 |
| | | | 398/115 |
| 2009/0211171 A1 | 8/2009 | Summers | |
| 2009/0269054 A1 * | 10/2009 | Smith | H04B 10/27 |
| | | | 398/25 |
| 2009/0317047 A1 * | 12/2009 | Smith | G02B 6/4457 |
| | | | 385/135 |
| 2010/0074578 A1 * | 3/2010 | Imaizumi | G02B 6/4446 |
| | | | 385/24 |
| 2010/0226654 A1 * | 9/2010 | Smith | H04B 10/2575 |
| | | | 398/116 |
| 2011/0058785 A1 * | 3/2011 | Solheid | G02B 6/4452 |
| | | | 385/135 |
| 2011/0311226 A1 * | 12/2011 | Smith | H04Q 11/0067 |
| | | | 398/45 |
| 2012/0027355 A1 * | 2/2012 | LeBlanc | G02B 6/3885 |
| | | | 385/54 |
| 2012/0234778 A1 * | 9/2012 | Anderson | H04Q 1/064 |
| | | | 211/26.2 |
| 2012/0293390 A1 * | 11/2012 | Shoemaker | H01Q 1/007 |
| | | | 343/853 |
| 2012/0293391 A1 * | 11/2012 | Simmons | H01Q 1/007 |
| | | | 343/859 |
| 2012/0295486 A1 * | 11/2012 | Petersen | G06F 1/00 |
| | | | 439/658 |
| 2015/0301301 A1 * | 10/2015 | Mullaney | G02B 6/4466 |
| | | | 385/100 |
| 2015/0355428 A1 * | 12/2015 | Leeman | G02B 6/4454 |
| | | | 385/135 |
| 2016/0091684 A1 * | 3/2016 | Van Cauteren | G02B 6/4494 |
| | | | 385/135 |
| 2016/0192044 A1 * | 6/2016 | Raza | G02B 6/3885 |
| | | | 398/49 |
| 2018/0364436 A1 * | 12/2018 | Zimmel | G02B 6/3883 |
| 2019/0018210 A1 * | 1/2019 | Coan | G02B 6/4457 |
| 2019/0056559 A1 | 2/2019 | Leeman et al. | |
| 2019/0302367 A1 * | 10/2019 | Van Baelen | G02B 6/28 |

FOREIGN PATENT DOCUMENTS

| | | |
|---|---|---|
| WO | 2014/096134 A1 | 6/2014 |
| WO | 2015/009713 A1 | 1/2015 |
| WO | WO 2015009713 A1 * | 1/2015 |
| WO | 2018/007649 A1 | 1/2018 |

OTHER PUBLICATIONS

Examination Report for European Patent Application No. 17807746.7 dated Jul. 2, 2021, 6 pages.

* cited by examiner

OPTICAL AND POWER NETWORK FOR MODULAR EQUIPMENT

CROSS-REFERENCE TO RELATED APPLICATION

This application is a National Stage Patent Application of PCT/EP2017/079,160, filed on Nov. 14, 2017, which claims the benefit of U.S. Patent Application Ser. No. 62/422,433, filed on Nov. 15, 2016, the disclosures of which is are incorporated herein by reference in their entireties. To the extent appropriate, a claim of priority is made to each of the above disclosed applications.

BACKGROUND

Rapid growth of portable high-speed wireless transceiver devices (e.g., smart phones, tablets, laptop computers, etc.) continues in today's market, thereby creating higher demand for untethered contact. Thus, there is growing demand for integrated voice, data and video capable of being transmitted wirelessly at data rates of 10 Gbits/second and faster. To provide the bandwidth needed to support this demand will require the cost effective and efficient deployment of additional fixed location transceivers (i.e., cell sites or nodes) for generating both large and small wireless coverage areas.

SUMMARY

Some aspects of the disclosure are directed to a network including a distribution cable; and connections stations disposed along the distribution cable. The distribution cable includes optical fibers carrying optical signals. The distribution cable also carries power. Each connection station has a port that is optically coupled to one of the optical fibers, thereby making the optical signals carried by the one of the optical fibers available at the port. The connection station also makes the power carried by the distribution cable available at the port.

In certain implementations, a module is configured to be mounted at one of the connection stations. The module includes a connection arrangement that mates with the port of the connection station.

In some examples, the module is a wireless transceiver module configured to wirelessly broadcast the optical signals obtained from the port. In other examples, the module is a security camera module. In other examples, the module is an optical splitter module.

In certain implementations, the connection arrangement of the module is shaped and configured to slide towards the port when the module is installed at the connection station.

In certain implementations, the module has a peripheral footprint that is no larger than a peripheral footprint of the connection station.

In certain implementations, the connection station has an additional port at which optical signals from the distribution cable can be accessed even when the module is installed at the connection station.

In certain implementations, each connection station includes first and second housing pieces between which a portion of the distribution cable is sandwiched.

In certain examples, the contact blades protrude from the first housing piece so that the contact blades automatically bite into the distribution cable and contact conductive members within the distribution cable when the connection station is assembled around the distribution cable.

In certain implementations, removable caps can be installed at the ports of the connection stations prior to installing the modules.

In certain implementations, the connection arrangement of the module protrudes from a rear of the module. The port of the connection station is disposed at a recessed area sized and shaped to receive the connection arrangement.

Other aspects of the disclosure are directed to a connection station for mounting along a distribution cable. The connection station includes a rear housing, an electrically conductive member, and a window. The rear housing defines an outer periphery about an interior, a passage through the interior, and a hybrid port spaced inwardly from the outer periphery. The electrically conductive member extends through the interior from the passage to the hybrid port. The window provides access between the passage and the interior.

In certain implementations, the hybrid port includes an optical fiber port and a power port.

In certain implementations, the optical fiber port includes a single fiber port.

In certain implementations, the power port includes a slot leading to an electrical contact of the electrically conductive member.

In certain implementations, an optical adapter is held within the interior of the rear housing at the hybrid port.

In certain implementations, a connectorized pigtail is plugged into the optical adapter to align with the hybrid port.

In certain implementations, excess length of the connectorized pigtail is stored at a splice tray disposed within the interior of the rear housing. The splice tray is configured to hold an optical splice between the pigtail and a cable fiber accessed through the window.

In certain implementations, a front housing couples to the rear housing to close the interior.

In certain implementations, the rear housing includes a first housing piece and a second housing piece that cooperate to define the passage.

In certain implementations, a module mounts at the connection station. The module includes a connection arrangement that mates with the hybrid port.

In certain examples, the wireless module is configured to wirelessly broadcast the optical signals obtained from the hybrid port.

In certain implementations, the rear housing defines a recessed area having an open end at the outer periphery. The recessed area leads to the hybrid port. The module includes a protruding support area at which the connection arrangement is disposed. The protruding support area and the recessed area are shaped and sized to fit together.

Other aspects of the disclosure are directed to a wireless module including a housing, a support area, and a connection arrangement. The housing has a front and a rear opposite the front. The housing has a height extending along the front between opposite sides of the periphery. The housing defines a periphery extending between the front and the rear. The housing carries a transceiver and an antenna. The support area protrudes outwardly from the rear of the housing. The support area extends along a length to the periphery. The length is less than a height of the housing. The connection arrangement is disposed at the support area. The connection area includes an optical fiber interface and a power interface.

In certain implementations, the optical fiber interface includes an optical fiber plug and the power interface includes an electrical contact extending upwardly from the support area.

In certain implementations, the electrical contact is a first electrical contact. The power interface includes a second electrical contact. The first and second electrical contacts are located at opposite sides of the optical fiber plug.

In certain implementations, the support area is sufficiently short that the connection arrangement is fully disposed within the periphery of the housing.

Other aspects of the disclosure are directed to a connection interface between a mounting station and a module. The connection interface includes a first housing and a second housing. The first housing has opposite front and rear surfaces. The first housing has a periphery extending between the front and rear surfaces. The first housing defines a recessed area extending inwardly from the front and the periphery. The first housing defines a hybrid port within the recessed area. The hybrid port defines an optical interface and a power interface. The second housing has opposite front and rear surfaces. The second housing includes a support area protruding from the rear surface. The support area does not extend beyond the periphery. The second housing includes a hybrid connection arrangement disposed at the support area. The hybrid connection arrangement includes an optical interface and a power interface.

In certain implementations, the first housing is a connection station and the second housing is a wireless module.

In certain implementations, the first housing is a wireless module and the second housing is a connection station.

In certain implementations, the optical interface of the first housing is an optical port and the optical interface of the second housing is an optical plug.

In certain implementations, the power interface of the first housing is an electrical socket leading to a recessed electrical contact and the power interface of the second housing is an electrical contact protruding from the support area.

In certain implementations, the electrical contact protruding from the support area is a first electrical contact. The power interface also includes a second electrical contact that is located at an opposite side of the optical interface from the first electrical contact.

Other aspects of the disclosure are directed to a method of installing a network. The method includes deploying a distribution cable including a plurality of optical fibers and a power conductor; cutting a window into a jacket of the distribution cable; accessing one of the optical fibers of the distribution cable at the window; installing a connection station at the window of the distribution cable, the connection station including a port; optically coupling the port to the optical fiber accessed from the distribution cable; and electrically coupling the port to the power conductor of the distribution cable.

In certain implementations, electrically coupling the port to the power conductor includes assembling first and second housing pieces of the connection station around the distribution cable at the window, the first housing piece including contact blades aligned to contact the power conductor when pressed into the distribution cable.

In certain implementations, optically coupling the port to the optical fiber includes splicing the optical fiber accessed from the distribution cable to a connectorized pigtail; and plugging a connectorized end of the connectorized pigtail into an optical adapter disposed at the port.

In certain implementations, optically coupling the port to the optical fiber includes connectorizing an end of the optical fiber accessed from the distribution cable; and plugging the connectorized end into an optical adapter disposed at the port.

In certain implementations, the method also includes installing a module at the connection station. The module includes a connection arrangement that mates with the port of the connection station.

In certain implementations, the module is not installed on the same day as the connection station is installed.

In certain implementations, the module is installed by sliding the wireless module until the connection arrangement mates with the port of the connection station.

In certain implementations, the method also includes installing a plurality of connection stations along the distribution cable, each connection station including a port; optically coupling the port of each connection station to one of the optical fibers of the distribution cable; and electrically coupling the port of each connection station to the power conductor of the distribution cable.

In certain implementations, the connection stations are not uniformly distributed along the distribution cable.

In certain implementations, not all of the connection stations are installed on the same day.

Other aspects of the disclosure are directed to a connection station including a housing, a recessed area, and a port. The housing has a front and a rear opposite the front. The housing defines a periphery extending between the front and the rear. The housing has a height extending along the front between opposite sides of the periphery. The housing defines apertures along the periphery through which a cable enters and exits the housing. The recessed area extends inwardly from the front and from the periphery. The recessed area extends less than the height of the housing. The port is disposed at the recessed area. The port includes an optical fiber interface and a power interface.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a system allowing incremental increases in wireless capacity within buildings (e.g., malls, apartments, airports, hotels, etc.) or elsewhere in an optical network. Optical signals are provided by a source S and carried by optical fibers over one or more distribution cables 101. Power also is carried over the distribution cable(s) 101 (e.g., from the source S). For convenience, the distribution cable(s) will be referred to as a single cable throughout this disclosure. It will be understood, however, that multiple distribution cables can be coupled together to provide the same function.

Figure 1:
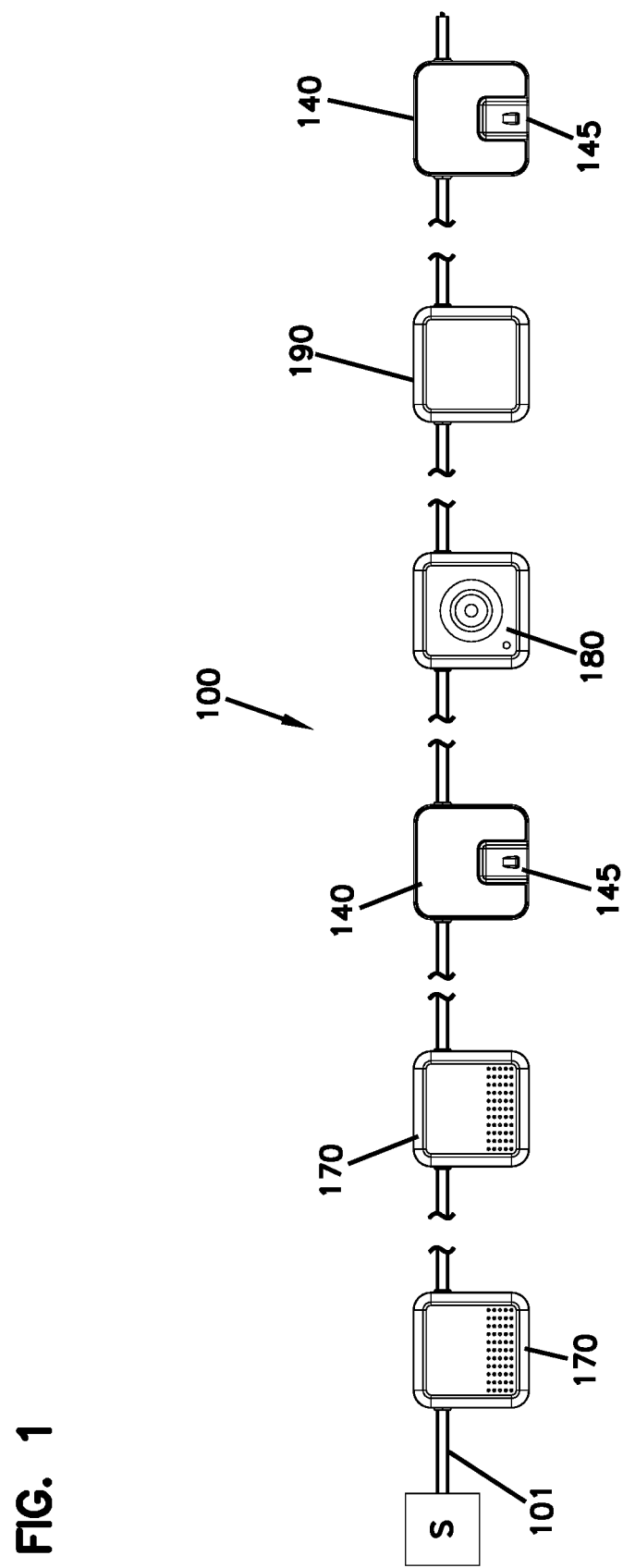
FIG. 1 is a schematic diagram of an example wireless network in which wireless transceivers can be incrementally added.

Referring to FIG. 1, one or more modules 150, 160, 170, 180, 190 can be added at desired locations along the distribution cable 101. In some implementations, a connection station 110 can be added to the distribution cable 101 at the desired location before the module is installed. The connection station 110 provides a port 115 at which the module 150, 160, 170, 180, 190 can be connected to the signals and/or power carried over the distribution cable 101. Accordingly, one or more connection stations 110 can be initially installed at the distribution cable 101 for minimal investment. The more expensive modules 150, 160, 170, 180, 190 can be subsequently added at the connection stations 110 when service is desired in that area surrounding the connection station. In certain implementations, the connection station 110 is configured to facilitate a quick connection as will be discussed in more detail herein.

As will be discussed in more detail herein, the modules 150, 160, 170, 180, 190 can include wireless transceiver modules 150, 160, 170, security cameras 180, and optical splitters 190. Of course, other types of modular equipment can be mounted to the connection stations 110.

Figure 2:
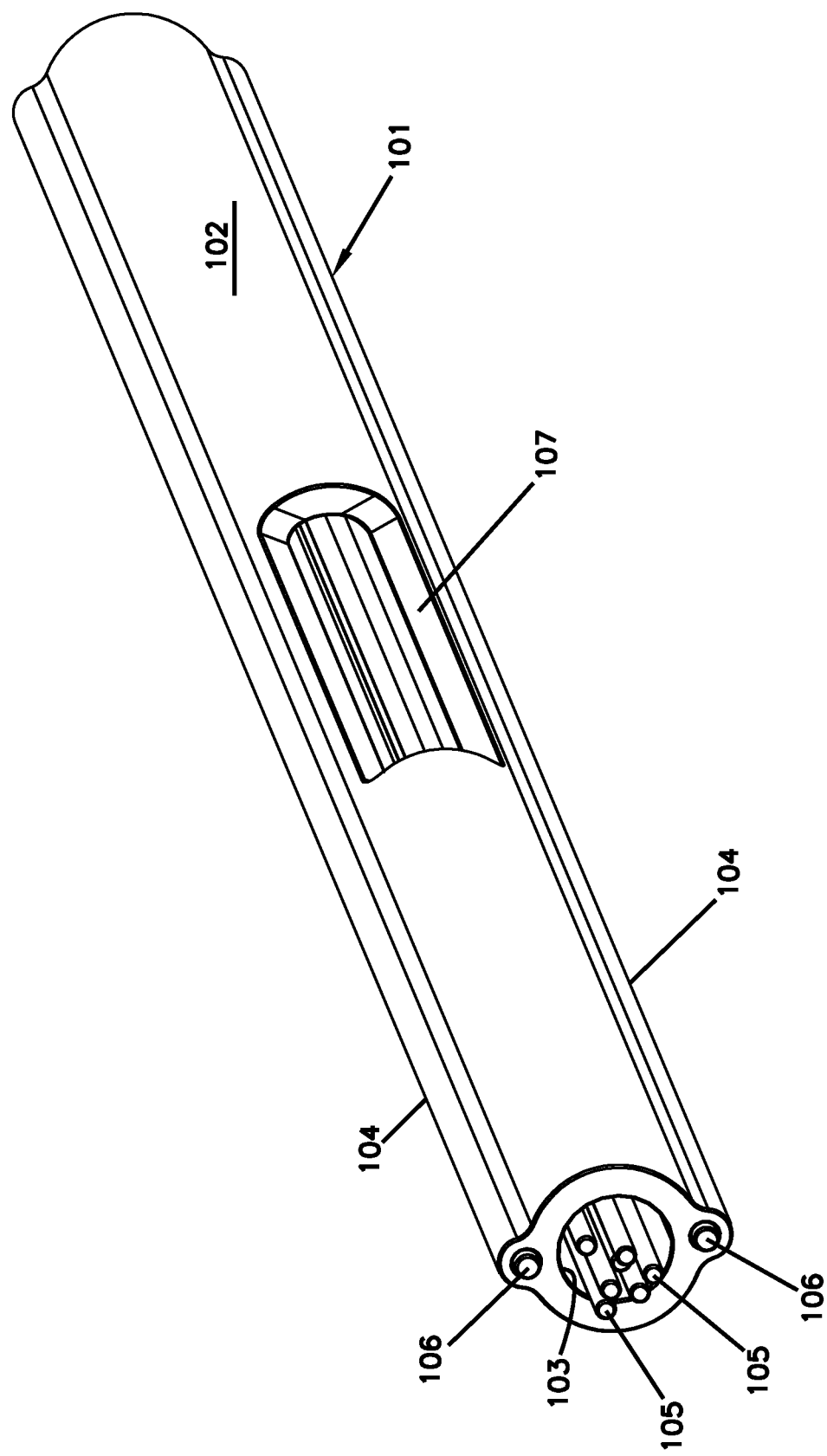
FIG. 2 is a perspective view of a portion of an example distribution cable carrying optical signals and power.

As shown in FIG. 2, an example distribution cable 101 includes a jacket or sheath 102 that defines a passage 103. One or more optical fibers or optical fiber bundles 105 are routed along the passage 103. In some examples, individual loose fibers are routed along the passage 103. In other examples, buffer tubes holding one or more fibers are routed along the passage 103. In the example shown, the distribution cable 101 includes six optical fibers 105. In other examples, however, the distribution cable 101 can include fewer (e.g., two, three, four) or more (e.g., eight, twelve, sixteen, thirty-two, sixty-four, ninety-six, one hundred forty-four) fibers 105.

To access one or more of the optical fibers 105, a window 107 can be cut in the jacket or sheath 102 to provide access to the passage 103. In some implementations, one or more of the fibers 105 can be cut at the window 107 and optically coupled to the distribution station. In other implementations, however, a second window 107 can be made downstream from the first window. The fiber(s) 105 to be accessed is/are cut the second window and pulled out of the jacket or sheath 102 at the first window 107. This technique provides a longer loose segment(s) of the accessed fiber(s) 105 to facilitate optically coupling the fiber(s) 105 to the connection station 110.

In certain implementations, the distribution cable 101 also carries power. In certain examples, one or more electrical conductors 106 (e.g., wires) are disposed within the jacket or sheath 102. In certain examples, the distribution cable 101 carries two conductors. In some examples, the distribution cable 101 carries one conductor for power and one conductor for ground. In other examples, however, the conductors can carry positive and negative voltage with respect to ground, AC 1 phase and neutral, or AC symmetrical to ground.

In examples, the conductors 106 are disposed within the jacket or sheath 102 separate from the passage 103. In the example shown, the conductors 106 are disposed in ridges 104 at opposite sides of the jacket or sheath 102. The electrical conductors 106 can be accessed by cutting into the ridges with an electrically conductive blade or other contact as will be discussed in more detail herein.

Figure 3:
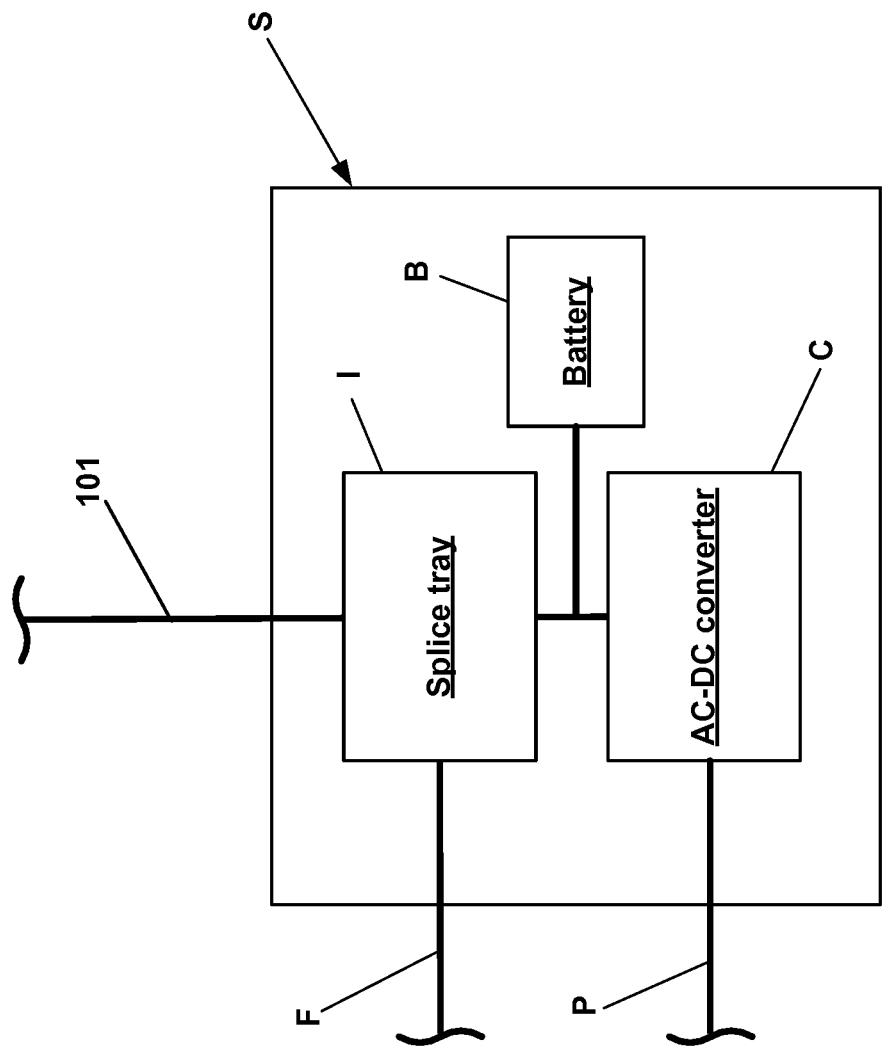
FIG. 3 is a schematic diagram of an example source of the optical signals and power of the wireless network of FIG. 1.

FIG. 3 illustrates an example source S to which the distribution cable 101 can be connected. The source S is configured to receive one or more feeder cables F and one or more power cables P. Optical fiber(s) of the feeder cable(s) F are coupled to the optical fibers 105 of the distribution cable 101 within the source S. For example, the optical fiber(s) of the feeder cable(s) F can be optical spliced (e.g., fusion splice or mechanical splice) to the optical fibers 105 of the distribution cable 101. The splices can be stored at a splice tray T.

In some implementations, conductors of one or more power cables P can be electrically coupled to the conductors 106 of the distribution cable 101 within the source S. For example, the power cable(s) P can be routed to an AC-DC converter C. The conductors 106 of the distribution cable 101 receive signals output by the converter C. In other implementations, the source S may include one or more batteries B to which the conductors 106 of the distribution cable 101 are electrically coupled to provide power along the distribution cable 101.

Figure 4:
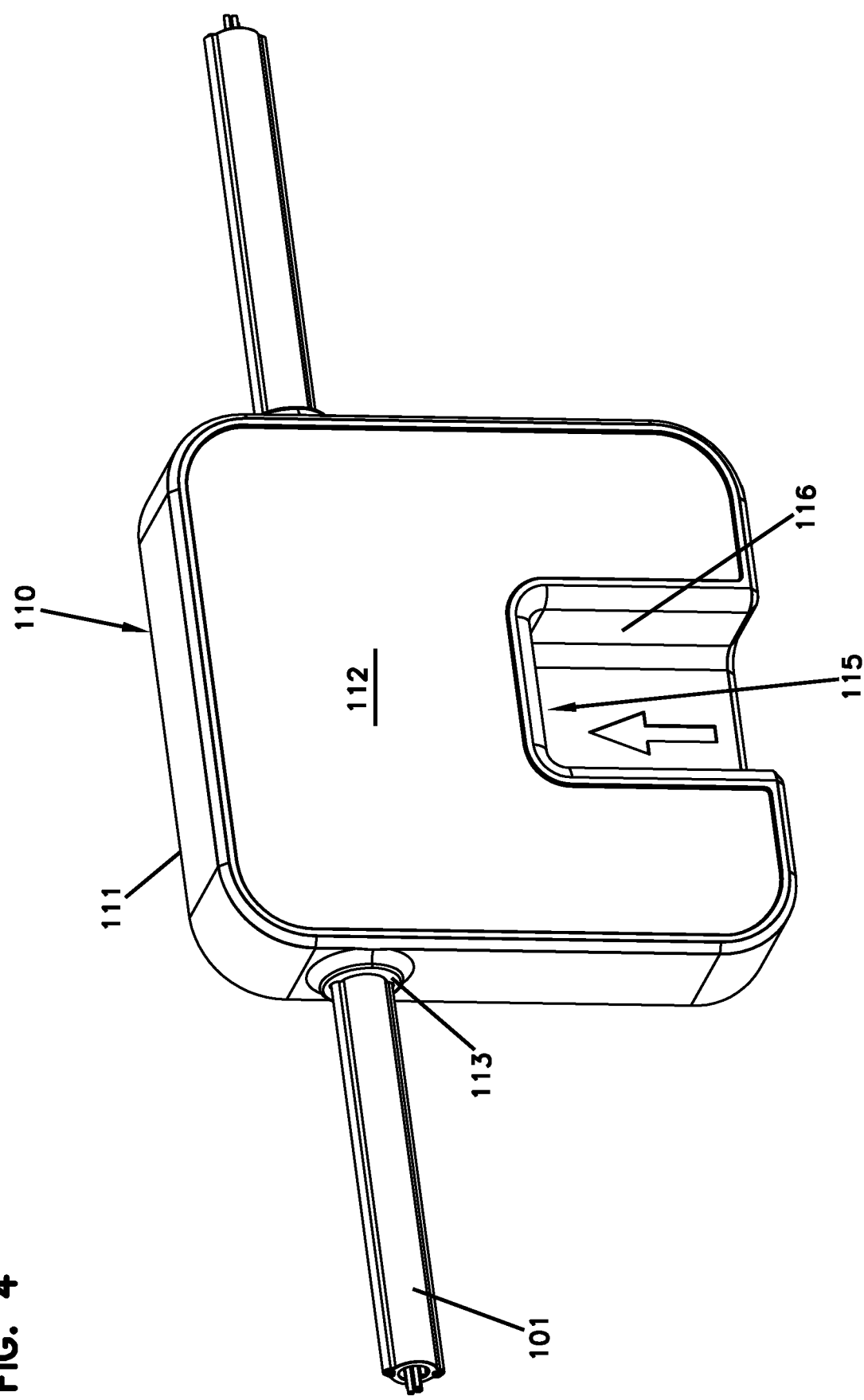
FIG. 4 is a perspective view of a first example connection station installed at a distribution cable.
Figure 5:
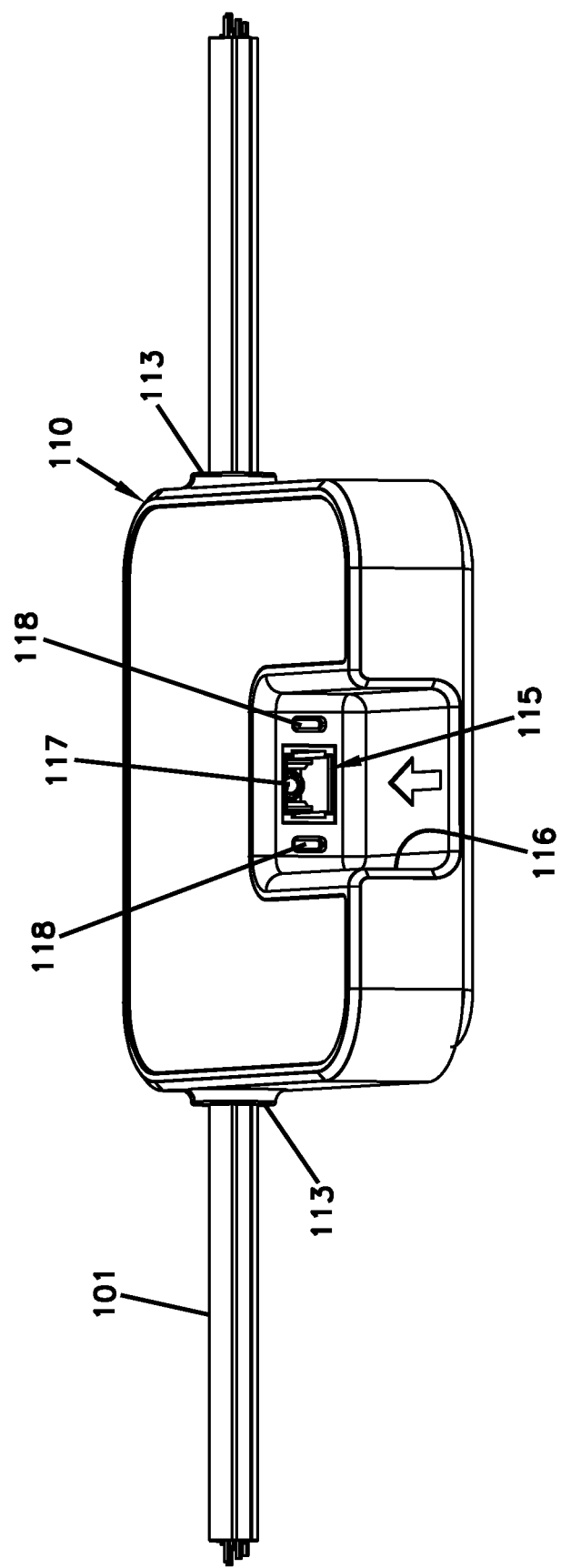
FIG. 5 is a perspective view showing an example port of the connection station of FIG. 4.
Figure 10:
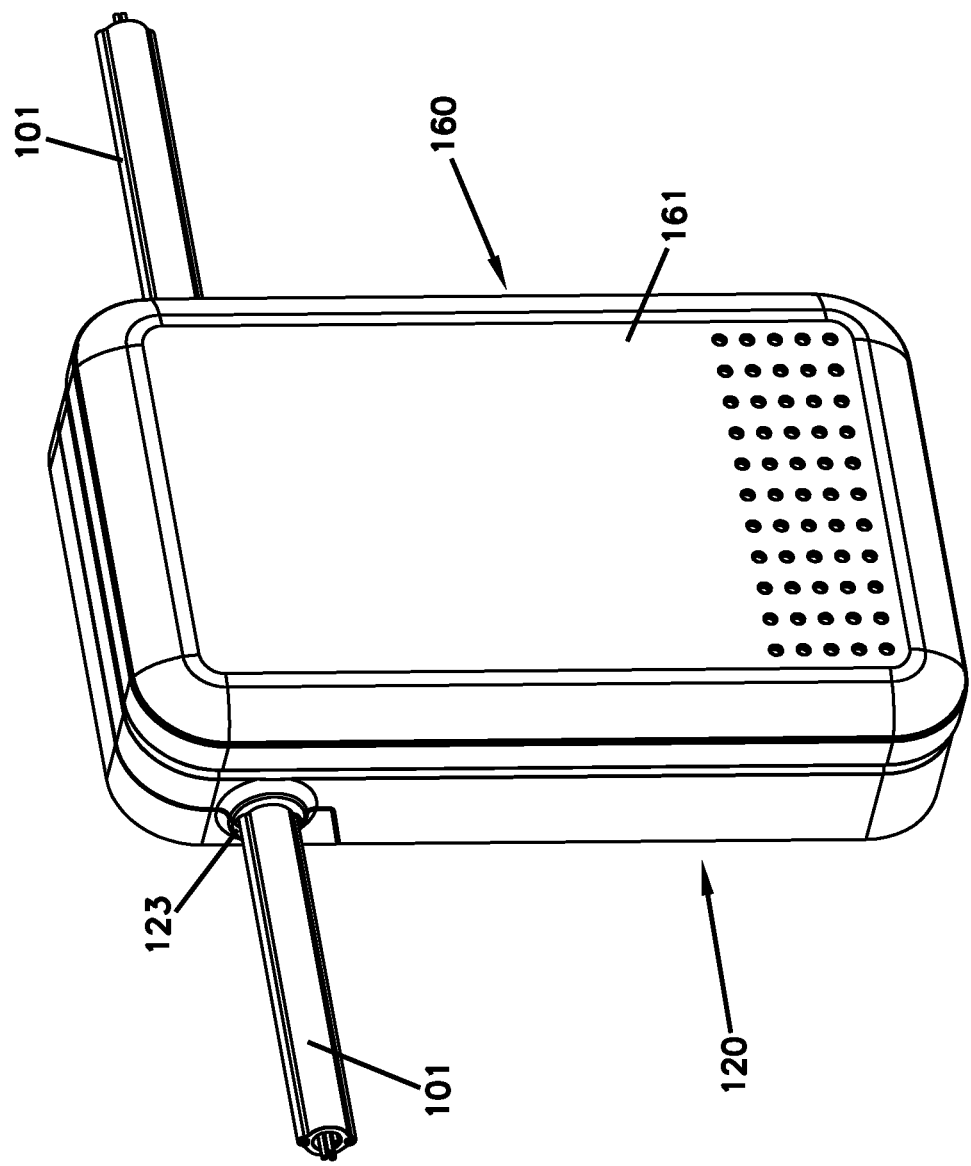
FIG. 10 is a perspective view of a second example connection station and wireless module installed at a distribution cable.
Figure 12:
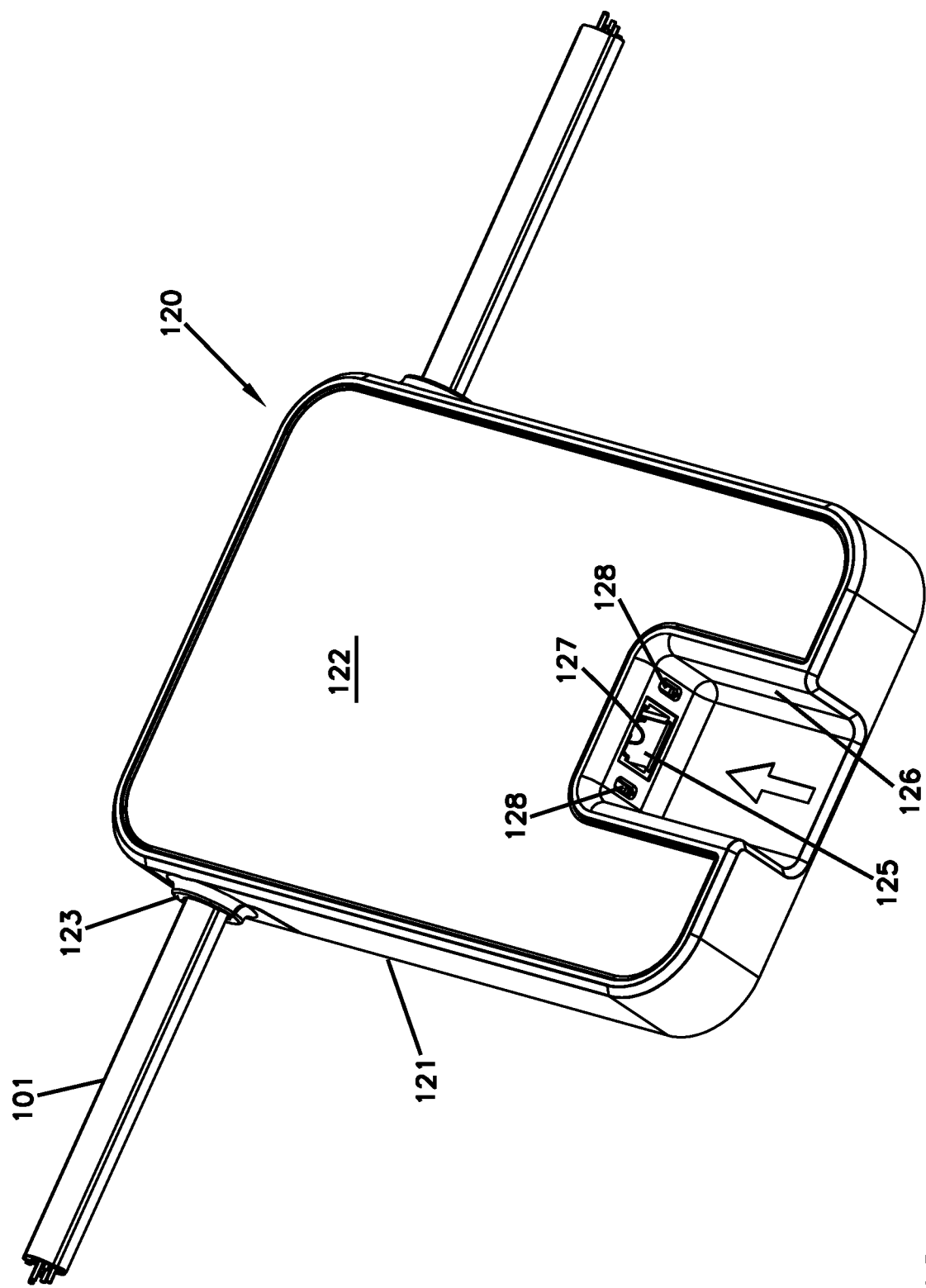
FIG. 12 is a front perspective view of the connection station of FIG. 10 with the wireless module removed.
Figure 13:
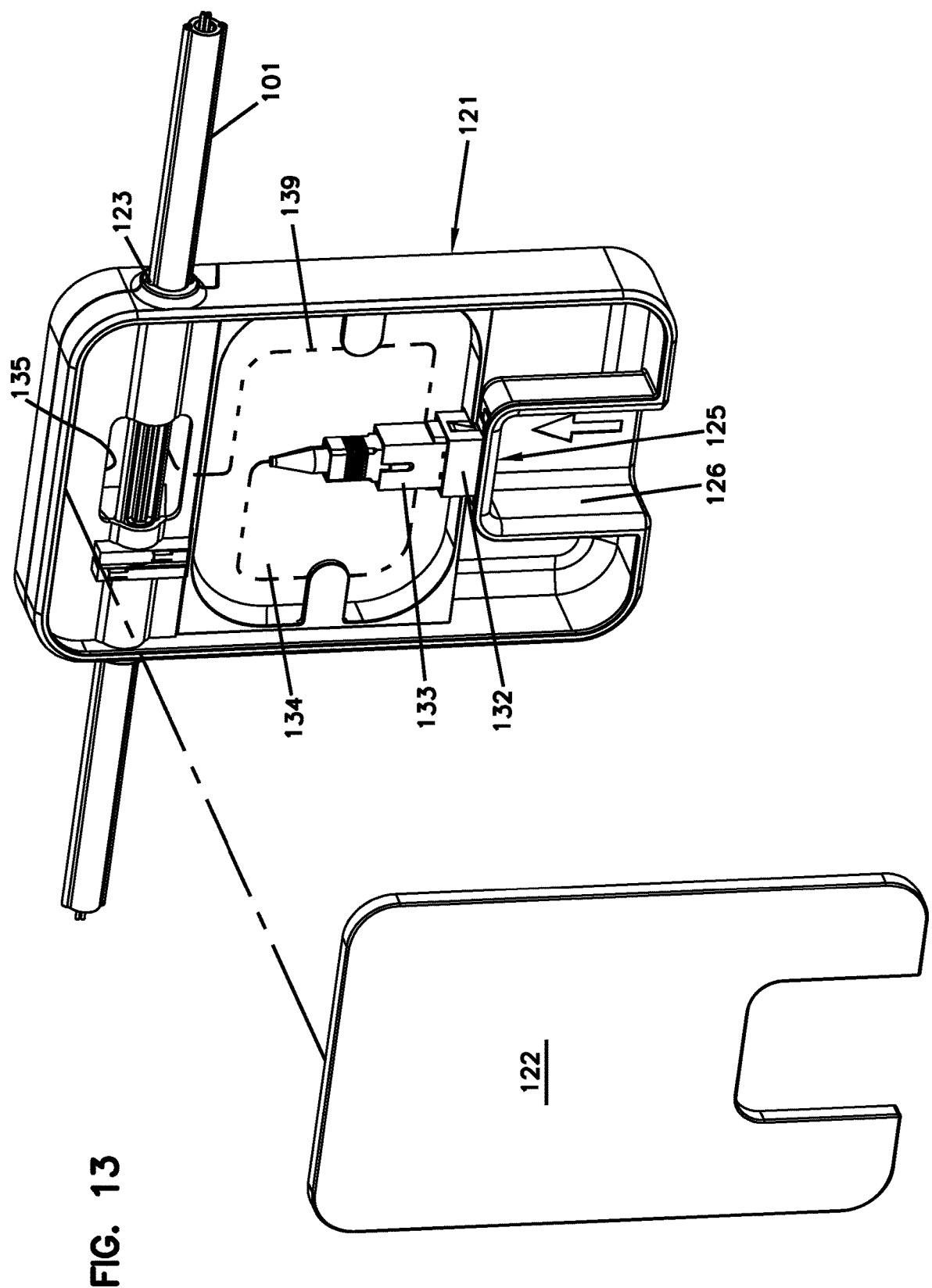
FIG. 13 is a perspective view of the connection station of FIG. 10 with a front housing exploded from a rear housing to expose an interior of the connection station.
Figure 14:
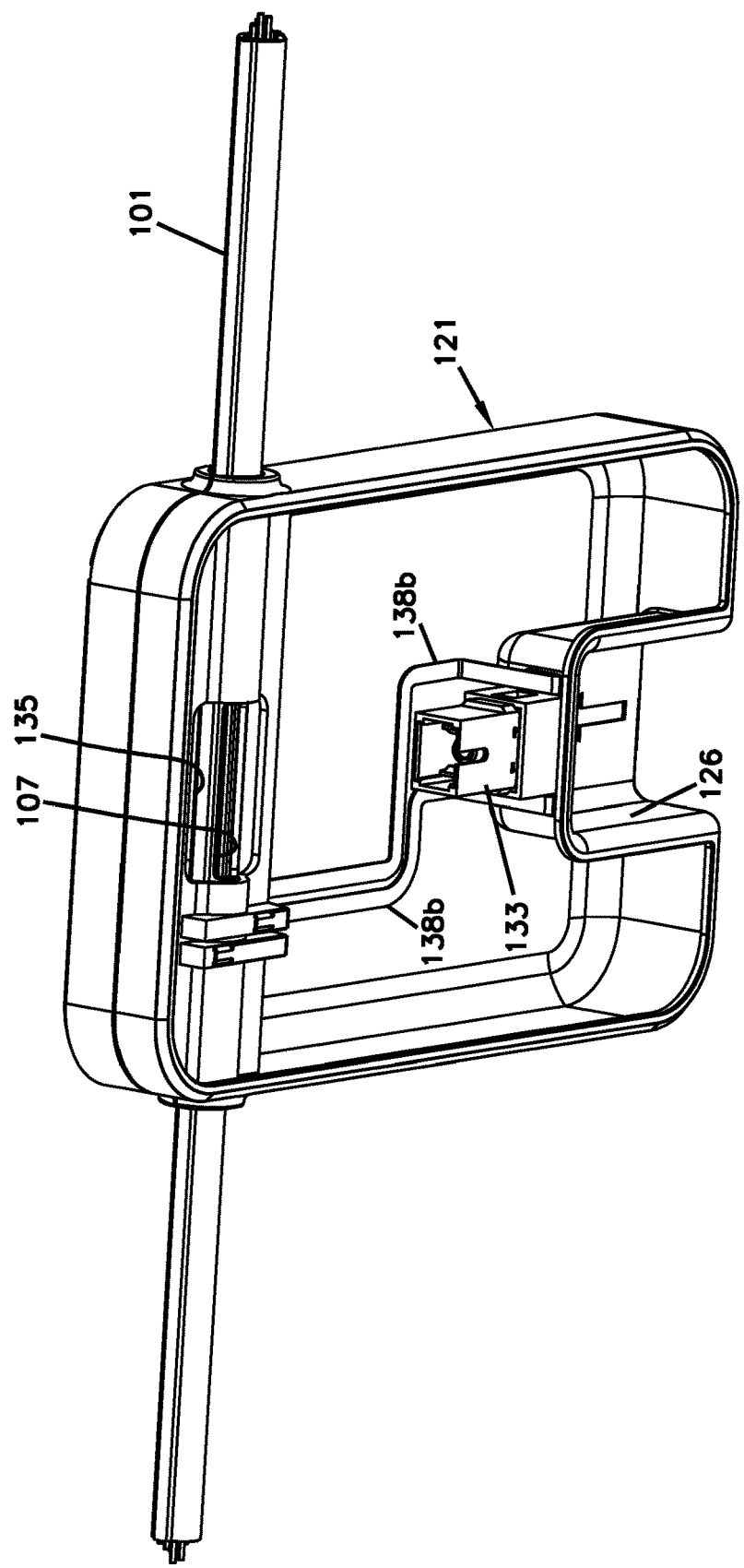
FIG. 14 is a perspective view of the connection station of FIG. 10 with a splice tray removed for ease in viewing other structure within the connection station.
Figure 18:
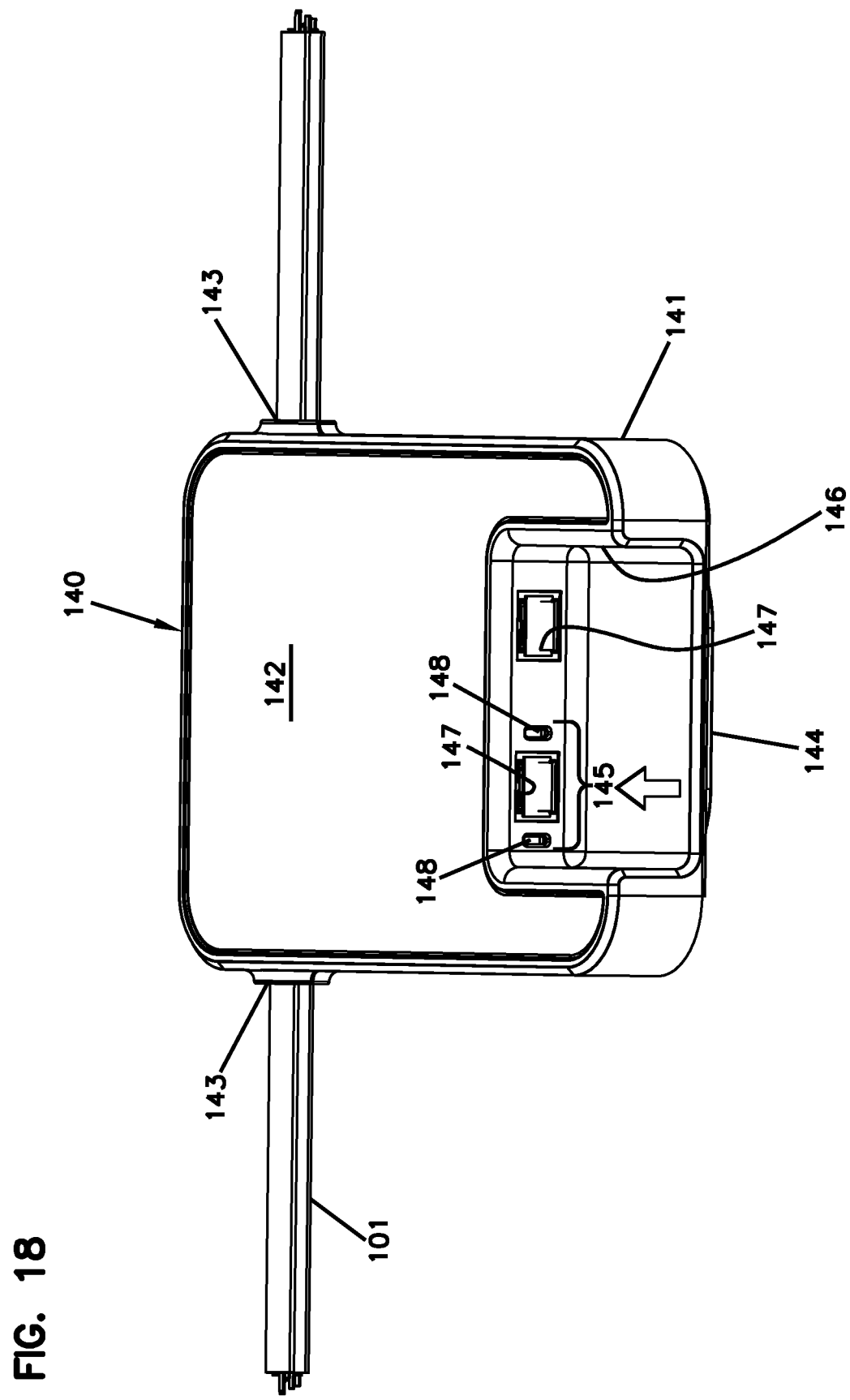
FIG. 18 is a perspective view of a third example connection station installed at a distribution cable.

FIGS. 4, 12, and 18 illustrate example connection stations 110, 120, 140 that can be installed at a desired location along the distribution cable 101. The connection station 110, 120, 140 defines a port 115, 125, 145 at which optical signals and/or power from the distribution cable 101 are accessible. In some implementations, a wireless module 150, 160, 170 (FIGS. 7, 10, and 20) can be coupled to the connections station 110, 120, 140 and optically and/or electrically coupled to the port 115, 125, 145. In other implementations, other modular devices (e.g., a camera 180, an optical splitter 190, a wave division multiplexer, and a repeater) can be coupled to the connection station 110, 120, 140. In other examples, an optical cable, an electrical cable, or an optical-electrical hybrid cable can be coupled to the port 115, 125, 145 to connect to the distribution cable 101. Such an optical, electrical, or hybrid cable could be used to provide a point-to-point connection between the connection station 110, 120, 140 and other optical, electrical, or hybrid equipment.

In some implementations, the distribution cable 101 is routed through the connection station 110, 120, 140. Only the optical fibers 105 needed at the connection station 110, 120, 140 are accessed. A remainder of the fibers 105 continues uninterrupted along the distribution cable 101. The connection station 110, 120, 140 defines first and second cable apertures 113, 123, 143 at which the distribution cable 101 enters and exits the connection station 110, 120, 140. In some implementations, the first and second cable apertures 113, 123, 143 are aligned at opposite sides of the connection station 110, 120, 140 (e.g., see FIGS. 4, 12, and 18). In other implementations, the first and second apertures 113, 123, 143 can be disposed at a common side of the connection station 110, 120, 140 in a butt-end configuration. In certain implementations, the apertures 113, 123, 143 can be sealed (e.g., by O-rings, gel, or other gaskets).

In some implementations, the connection station 110, 120, 140 includes a rear housing member 111, 121, 141 and a front housing member 112, 122, 142 that cooperate to define an interior through which the distribution cable 101 passes. The optical and/or power connections between the distribution cable 101 and the port 115, 125, 145 are formed within the interior as will be described in more detail herein with respect to FIGS. 13-17. In certain implementations, the rear housing member 111, 121, 141 includes mounting structure 124, 144 for supporting the connection station 110, 120, 140 at a wall, post, or other location as will be discussed in more detail herein with respect to FIG. 11.

In certain implementations, the connection station 110, 120, 140 defines a recessed area 116, 126, 146 at which the port 115, 125, 145 is located. The recessed area 116, 126, 146 provides space at which to receive a portion of the module 150, 160, 170, 180, 190 or other connector within a footprint or boundary of the connection station 110, 120, 140. In certain implementations, the recessed area 116, 126, 146 is open at one end of the periphery of the connection station 110, 120, 140 to facilitate insertion of a connector or module into the recessed area 116, 126, 146.

In some implementations, the port 115, 125, 145 includes a fiber port 117, 127, 147. In other implementations, the port 115, 125, 145 includes a power port 118, 128, 148. In certain implementations, the port 115, 125, 145 includes both a fiber port 117, 127, 147 and a power port 118, 128, 148. In some implementations, the power port 118, 128, 148 includes one or more slots at which electrical contacts are received. In such implementations, the slots lead to electrical contacts disposed within the connection station 110, 120, 140. In other implementations, the power port 118, 128, 148 can include electrical contacts extending into the recessed area 116, 126, 146. In some examples, the power port 118, 128, 148 includes a single slot or contact. In other examples, the power port 118, 128, 148 includes two slots or contacts (i.e., one for power and one for ground). In still other examples, the power port 118, 128, 148 may include any desired number of slots or contacts.

In some examples, the fiber port 117, 127, 147 is configured to receive a single-fiber connector plug. For example, the fiber port 117, 127, 147 can be configured to receive an SC connector, an LC connector, an ST connector, and FC connector, an LX.5 connector, a bare fiber connector, etc. In other examples, the fiber port 117, 127, 147 is configured to receive a multi-fiber connector plug. For example, the fiber port 117, 127, 147 can be configured to receive a dual LC connector or an MPO connector. In some examples, the fiber port 117, 127, 147 is ruggedized (i.e., environmentally sealed and sufficiently robust to withstand a pullout force of about fifteen pounds). In other examples, the fiber port 117, 127, 147 is not ruggedized.

Figure 6:
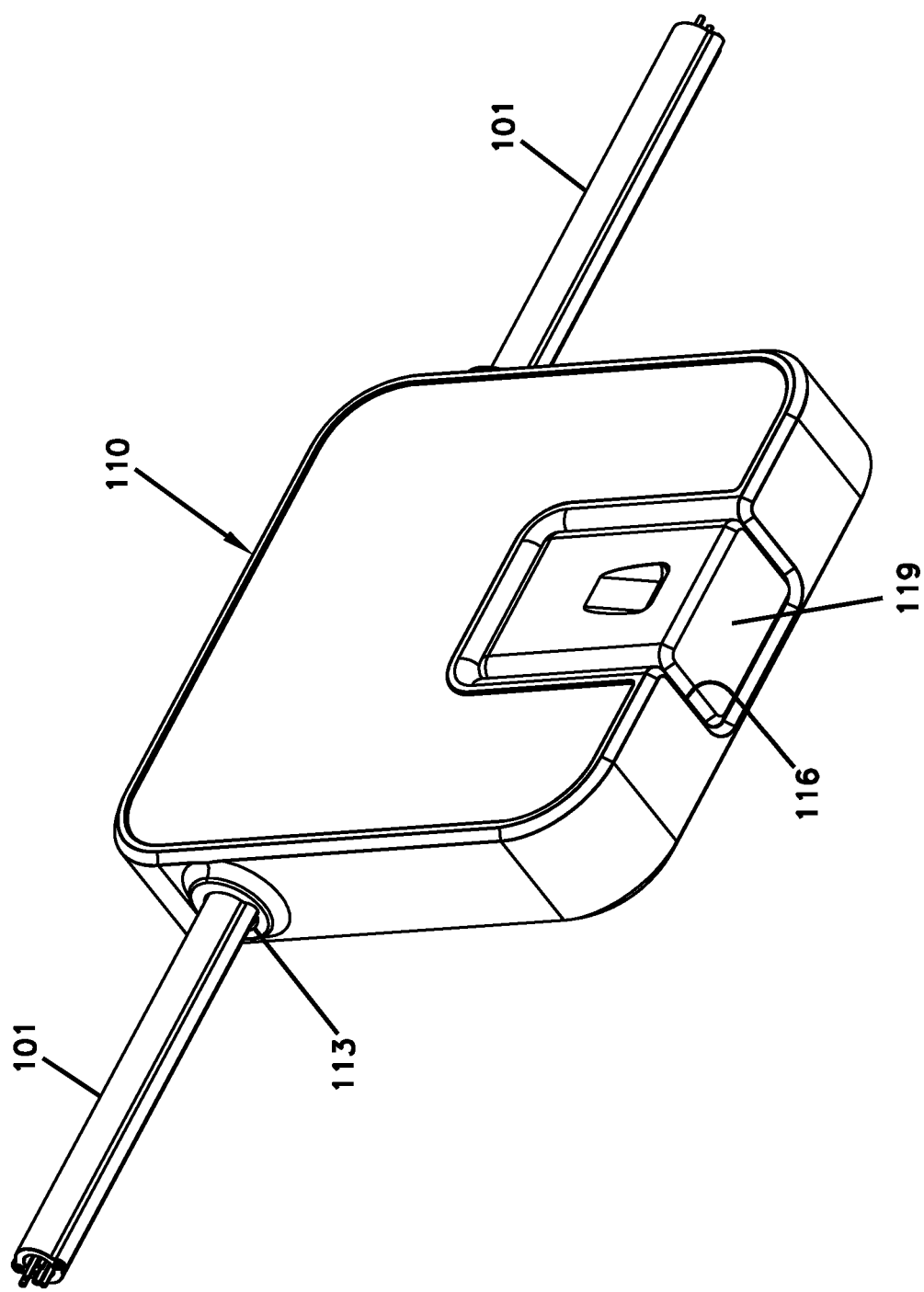
FIG. 6 shows a cap disposed at the port of the connection station of FIG. 4.
Figure 19:
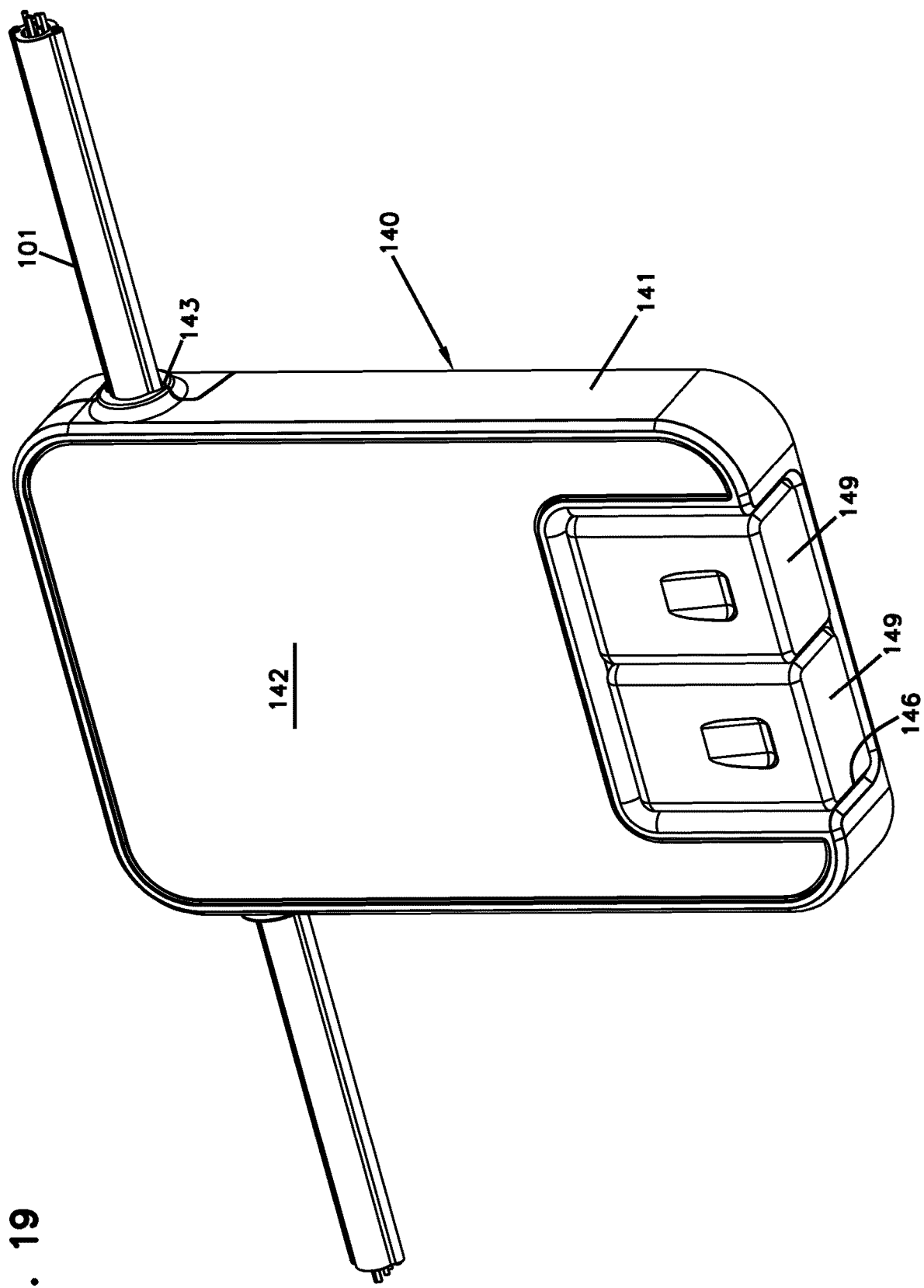
FIG. 19 shows two caps received at the ports of the connection station of FIG. 18.

In accordance with some aspects of the disclosure, the port 115, 125, 145 need not be accessed immediately after the connection station 110, 120, 140 is installed at the distribution cable 101. As shown in FIGS. 6 and 19, a cap 119, 149 can be received at the port 115, 125, 145 and/or at the recessed area 116, 126, 146 when the port 115, 125, 145 is vacant. The cap 119, 149 inhibits dust, dirt, or other contaminants from entering the port 115, 125, 145. In certain examples, the cap 119, 149 environmentally seals the connection station 110, 120, 140 at the port 115, 125, 145. In some examples, the cap 119, 149 can have the same outer structure as an optical plug configured to be received at the fiber port 117, 127, 147 without the optical fiber. In other examples, the cap 119, 149 is structured to mate with the connection station 110, 120, 140 (e.g., with the recessed area 116, 126, 146) to hold the cap 119, 149 in place without engaging the fiber port 117, 127, 147.

Figure 7:
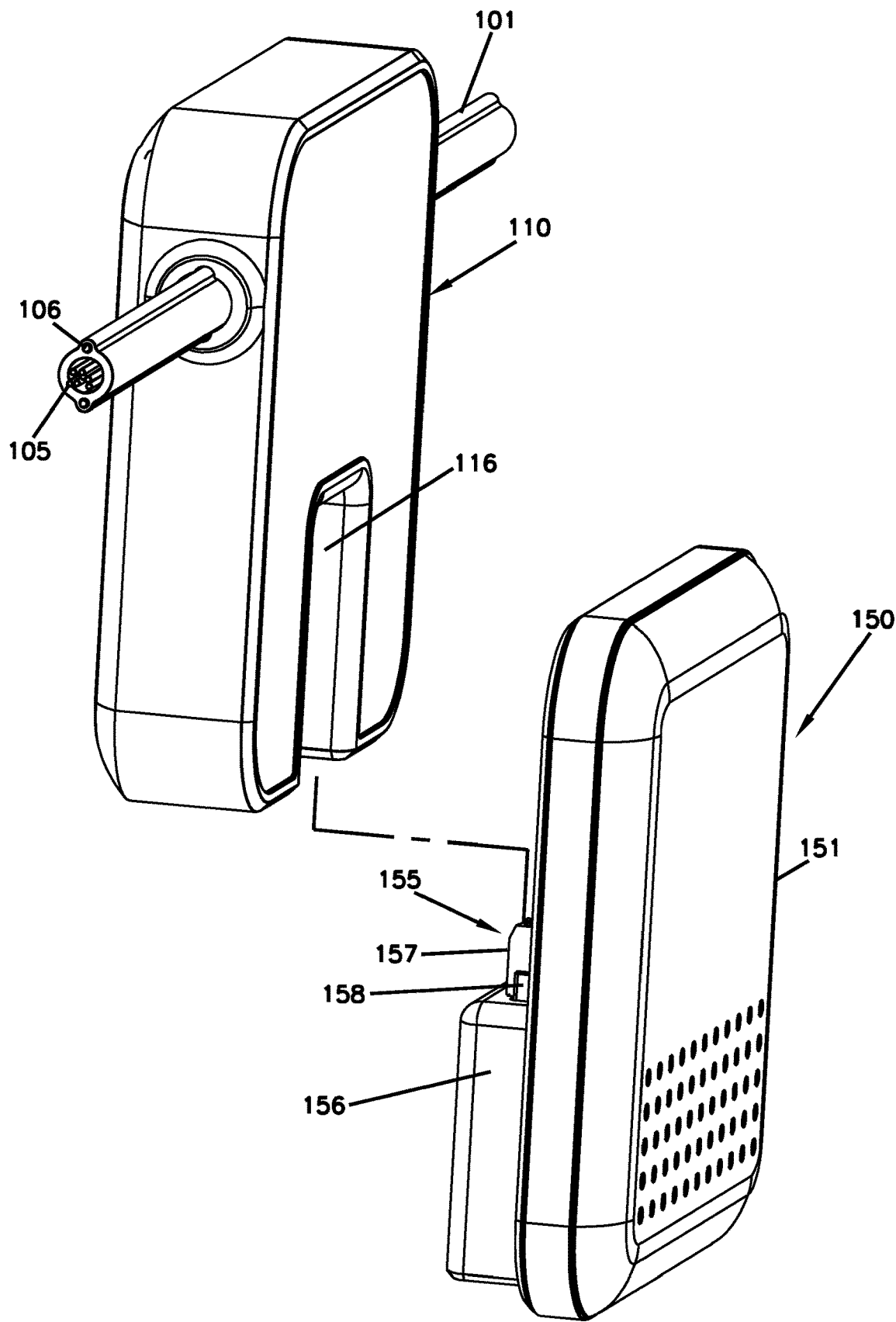
FIG. 7 shows an example wireless module exploded from the connection station of FIG. 4.
Figure 8:
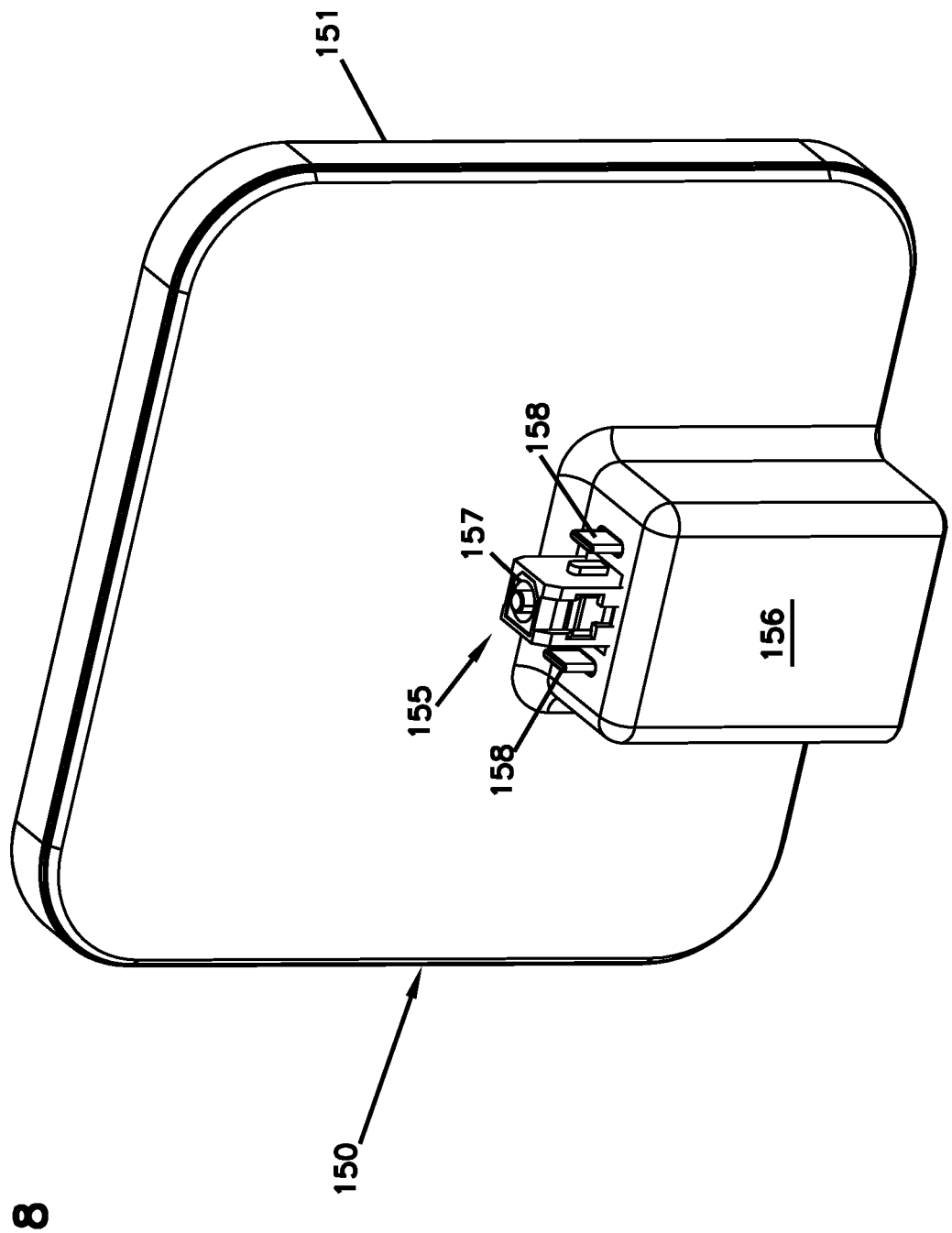
FIG. 8 is a rear perspective view of the example wireless module of FIG. 7.
Figure 9:
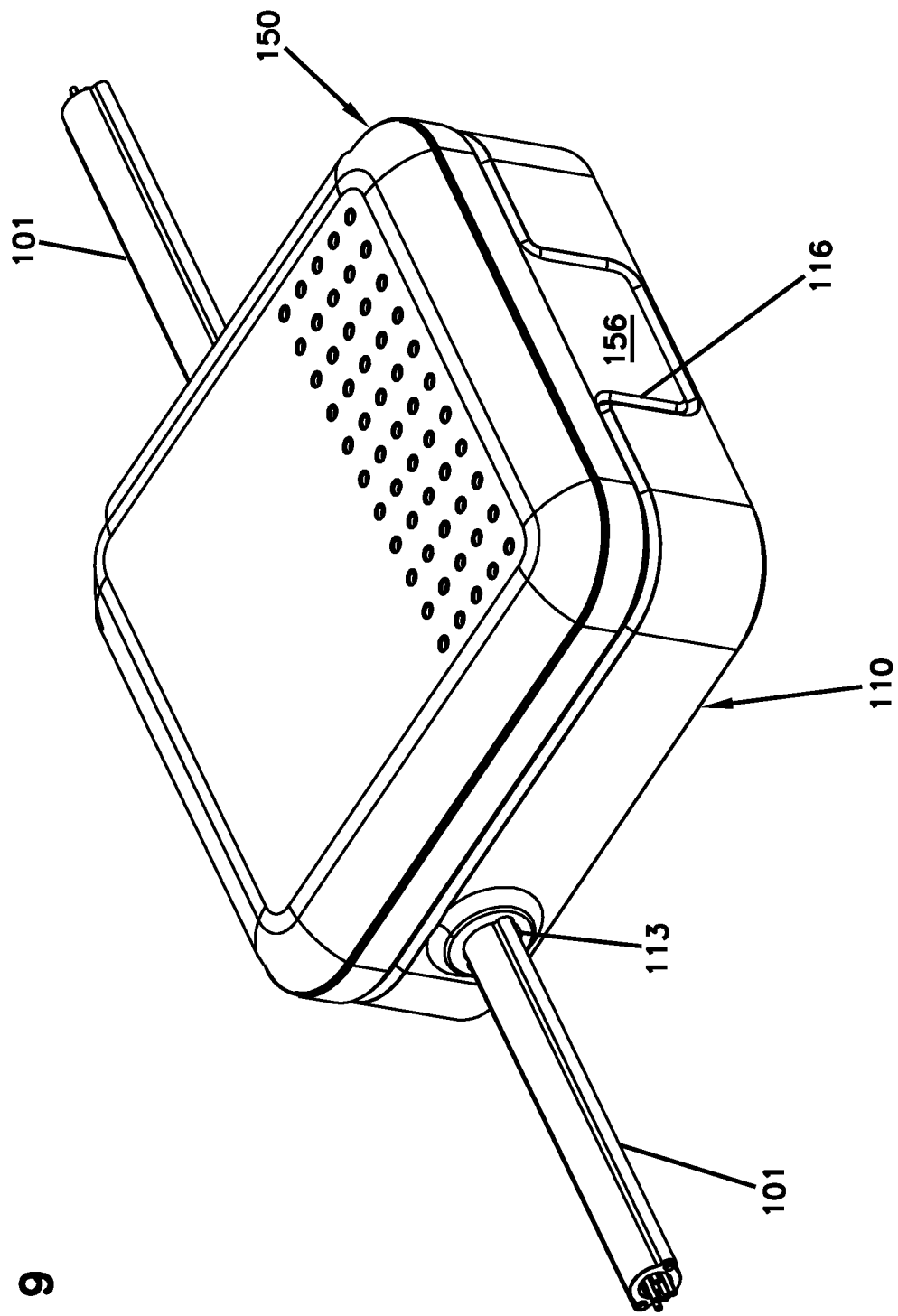
FIG. 9 is a perspective view of the wireless module of FIG. 7 installed at the connection station of FIG. 4.

FIGS. 7-9 illustrate mounting an example module at an example connection station. For the sake of convenience, the wireless transceiver module 150 and the connection station 110 are illustrated. In some implementations, the module is a wireless transceiver module 150, 160, 170 includes a housing 151, 161, 171 carrying a transceiver and antenna to broadcast signals. In certain implementations, the wireless module can be, e.g., a WiFi access point according to IEEE 802.11a/b/g/n/ac, a 3G picocell or femtocell, a 4G picocell or femtocell or future similar wireless devices. In other examples, the module is a camera 180, optical splitter 190, or other such modular equipment.

The module 150, 160, 170, 180, 190 includes a connection arrangement 155, 165, 175 for mating with the port 115, 125, 145 of the connection station 110, 120, 140. In certain examples, the module 150, 160, 170, 180, 190 runs on power received from the distribution cable 101 via the port 115, 125, 145. The wireless module 150, 160, 170 broadcasts signals obtained from the optical fiber in the distribution cable 101 via the port 115, 125, 145 of the connection station 110, 120, 140. The camera module 180 sends a video signal to the distribution cable 101 via the port 115, 125, 145. The optical splitter module 190 splits an optical signal received from the port 115, 125, 145 onto multiple outputs (e.g., output ports) carried by the splitter module 190.

Figure 11:
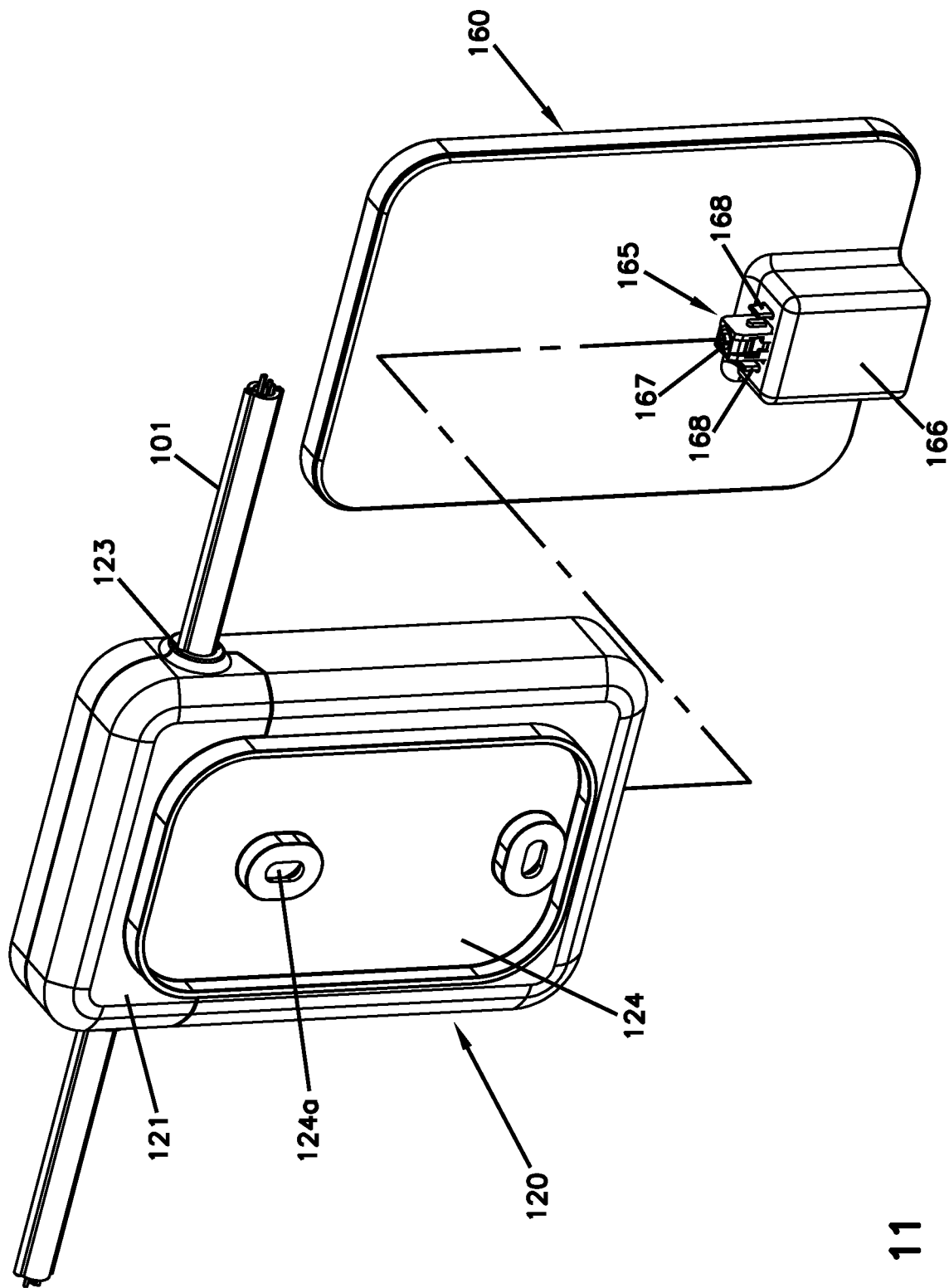
FIG. 11 is a rear perspective view of the connection station of FIG. 10 with the wireless module of FIG. 10 exploded therefrom.

As shown in FIGS. 8 and 11, the connection arrangement 155, 165, 175 includes a fiber plug connector 157, 167. In some examples, the fiber plug connector 157, 167 is a single-fiber connector. In various examples, the single-fiber connector is an SC connector, an LC connector, an ST connector, and FC connector, an LX.5 connector, a bare fiber connector, etc. In other examples, the fiber plug connector 157, 167 is a multi-fiber connector (e.g., a dual LC connector or an MPO connector). In certain examples, the connection arrangement 155, 165, 175 also includes an electrical contact 158, 168. In the example shown, the connection arrangement 155, 165, 175 includes two electrical contacts 158, 168 protruding upwardly from the connection support area 156, 166, 176 at opposite sides of the plug connector 157, 167.

In some implementations, the connection arrangement 155, 165, 175 is configured so that the module 150, 160, 170, 180, 190 mounts to the connection station 110, 120, 140 in a sliding motion. Accordingly, the module 150, 160, 170, 180, 190 can easily be added after installation of the distribution cable 101 and the connection station 110, 120, 140. In certain implementations, the connection arrangement 155, 165, 175 is fully disposed within a peripheral boundary of the module housing 151, 161, 171 (see FIGS. 8 and 11). In an example, the connection arrangement 155, 165, 175 is disposed at a center of the module housing 150, 160, 170, 180, 190.

In some implementations, the connection arrangement 155, 165, 175 protrudes outwardly from a portion of the housing 151, 161, 171. In other implementations, the connection arrangement 155, 165, 175 can be accessible through an opening defined in the housing 151, 161, 171. For example, the opening may be sufficiently large to accept part of an optical adapter or optical plug connector. In certain implementations, the housing 151, 161, 171 includes a connection support area 156, 166, 176 that carries the connection arrangement 155, 165, 175. In certain implementations, the connection support area 156, 166, 176 protrudes from the housing 151, 161, 171.

In some implementations, the connection support area 156, 166, 176 is contained within a peripheral boundary of the housing 151, 161, 171. In certain implementations, part of the connection support area 156, 166, 176 extends to an outer periphery of the housing 151, 161, 171. In some examples, the connection support area 156, 166, 176 is centered between opposite sides of the housing 151, 161, 171. In other examples, however, the connection support area 156, 165, 175 can be offset towards one of the opposite sides. In some examples, the connection support area 156, 166, 176 borders or contacts a periphery of the housing 151, 161, 171.

In certain implementations, the connection support area 156, 166, 176 is shaped to fit within the recessed area 116, 126, 146 of the connection station 110, 120, 140. In certain examples, the module 150, 160, 170, 180, 190 is slid relative to the connection station 110, 120, 140 so that the connection support area 156, 166, 176 slides through an open end of the recessed area 116, 126, 146 until the connection arrangement 155, 165, 175 is received at the port 115, 125, 145. In the example shown, the module 150, 160, 170, 180, 190 is slid parallel to an insertion axis of the fiber port 117, 127, 147.

In certain implementations, a peripheral footprint of the module 150, 160, 170, 180, 190 is no larger than a peripheral footprint of the connection station 110, 120, 140. In certain implementations, adding the module 150, 160, 170, 180, 190 to the connection station 110, 120, 140 does not increase a footprint of that unit at the distribution cable 101.

FIG. 11 shows example mounting structure 124, 144 of the connection station 110, 120, 140 by which the connection station 110, 120, 140 can be mounted to a wall, poll, or other surface adjacent the distribution cable 101. In the example shown, the mounting structure 124, 144 includes a plate defining fastener apertures 124a. In other examples, the mounting structure can include latches, straps, adhesive or other securement structures to hold the connection station 110, 120, 140 to a surface.

FIGS. 13-17 illustrate an example interior of a connection station 120. It should be understood that the connection station 110, 140 can be similarly configured. The rear housing 121 defines a passage along which the distribution cable 101 can pass. In some examples, the passage is open to or part of the interior of the rear housing 121. In other examples, the rear housing 121 defines a window 135 providing access to the passage. In such examples, the window 135 aligns with the window 107 cut into the jacket or sheath 102 of the cable 101.

An optical fiber 105 of the cable 101 is accessed through the window 107 (e.g., through the window 135). An end face of the accessed optical fiber 105 is routed within the interior of the rear housing 121 to the port 125 to align with the fiber port 127. In some implementations, the end face of the accessed optical fiber 105 is connectorized and plugged into an adapter 133 held at the port 125. In other implementations, the end face of the accessed optical fiber 105 is spliced (e.g., fusion spliced, mechanically spliced, etc.) to a connectorized pigtail 139 that plugs into the adapter 133. In such implementations, excess length of the pigtail 139 can be stored at a splice tray 134 disposed within the rear housing 121.

The connection station 120 includes an adapter holder 132 configured to support the adapter 133. In some examples, the adapter 133 is a hybrid adapter to connecting both optical plugs and electrical plugs. In other examples, the adapter 133 is an optical adapter (e.g., an SC adapter, an LC adapter, an MPO adapter, an LX.5 adapter, a base fiber connector adapter, etc.). Separate electrical conductive members 138 extend through the interior of the rear housing 121 between the port 125 (e.g., the electrical slots 128) and the distribution cable 101 (see FIG. 14).

Figure 15:
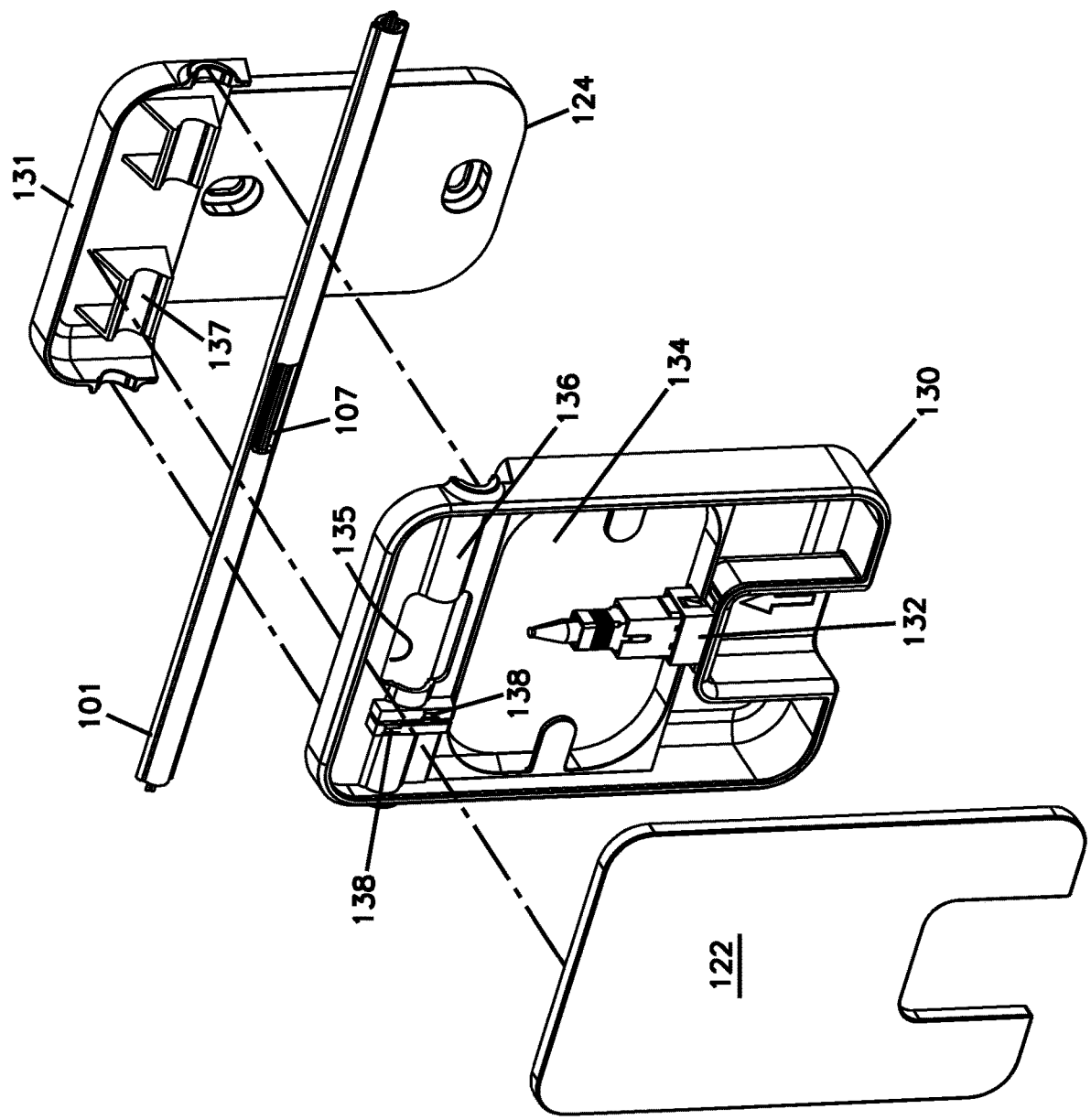
FIG. 15 is a front perspective view of the connection station of FIG. 13 with the rear housing separated into first and second housing pieces.
Figure 16:
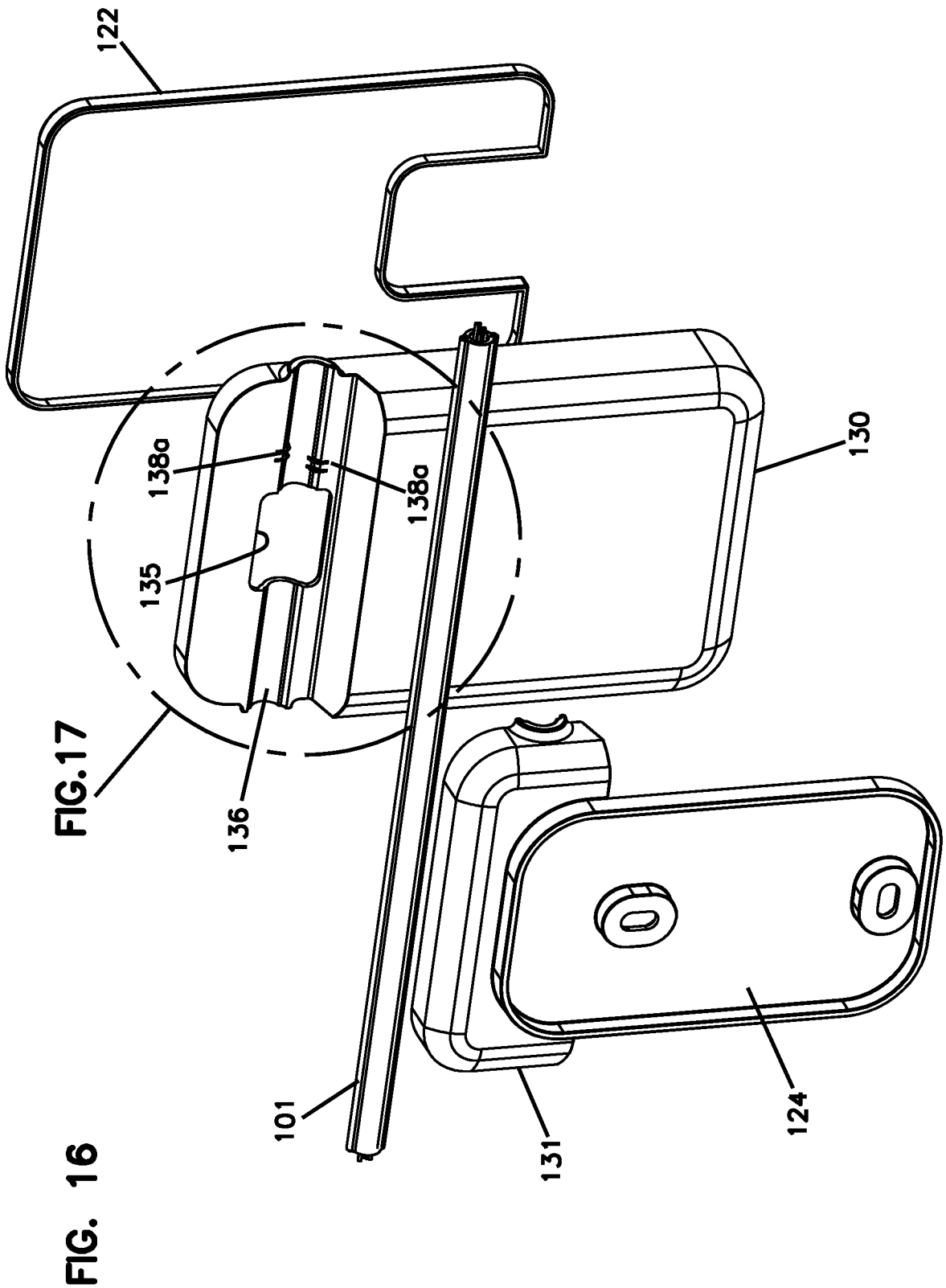
FIG. 16 is a rear perspective view of the connection station of FIG. 15.
Figure 17:
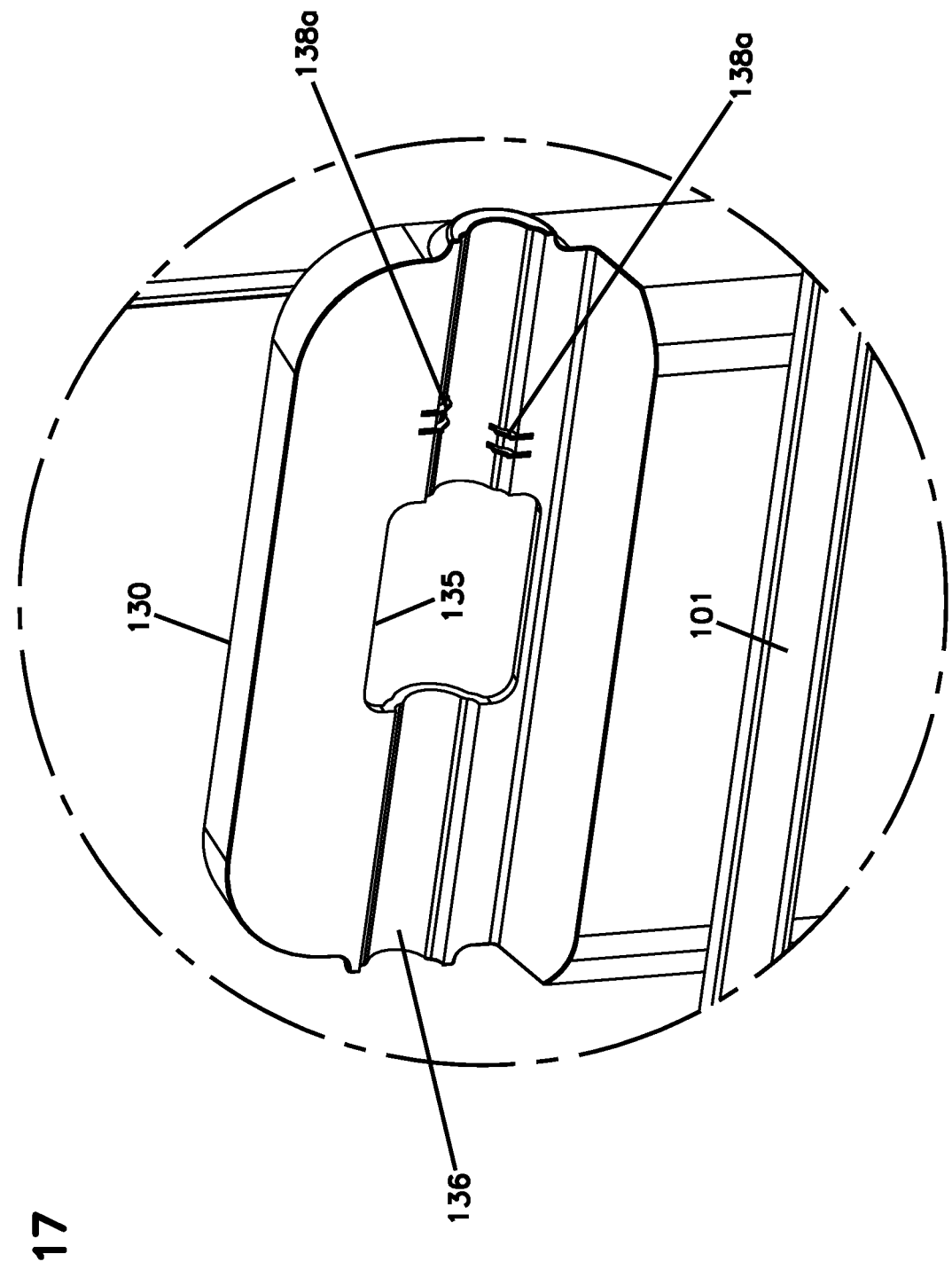
FIG. 17 is an enlarged view of a portion of FIG. 16.

FIGS. 15-17 illustrate an example rear housing 121 including first and second housing pieces 130, 131 between which the distribution cable 101 is held. In accordance with certain aspects of the disclosure, mechanically assembling the first and second housing pieces 130, 131 about the distribution cable 101 automatically connects the electrical conductors 106 of the cable 101 to contacts 138a of the electrical conductive members 138 of the rear housing 121 as will be described in more detail herein.

In certain implementations, the first housing piece 130 defines the recessed area 126 and the port 125 of the rear housing 121. In certain implementations, the first housing piece 130 defines the window 135 providing access to the distribution cable 101. In certain examples, the first housing piece 130 carries a splice tray 134. In certain implementations, the second housing piece 130 carries the mounting structure 124 of the rear housing 121.

In the example shown, the first and second housing pieces 130, 131 each define one or more grooves 136, 137 that cooperate with the groove(s) 137, 136 of the other piece 131, 130 to define the passage through which the distribution cable 101 extends. In the example shown in FIG. 15, the second housing piece 131 includes one or more platforms that each defines a groove 137 to receive the distribution cable 101.

In the example shown in FIG. 16, the first housing piece 130 defines a groove 136 interrupted by the window 135. Accordingly, the groove 136 routes the distribution cable 101 across the window 135.

In some examples, contacts 138a of the electrical conductive members 138 of the rear housing 121 protrude into the groove 136. In certain examples, the contacts 138a are spaced at opposite sides of the groove 136 in alignment with the ridges 104 of the cable 101. In certain examples, the contacts 138a are blades (e.g., see FIG. 17). Accordingly, when the first and second housing pieces 130, 131 are assembled, the second housing piece 131 presses the cable 101 into the first housing piece 130 sufficient to cause the bladed contacts 138a to cut into the jacket or sheath 102 of the cable 101 sufficient to contact the conductive members 106 of the cable 101. The electrical conductive members 138 provide power from the conductive members 106 to the power port 128 of the connection station port 125.

In some implementations, the connection stations 110, 120, 140 are installed at desired points along the distribution cable 101 and one or more wireless modules 150 are subsequently installed as needed. In certain implementations, additional connection stations 110, 120, 140 can be added to the network at any time. For example, to install an additional connection station 110, 120, 140, a window 107 is cut in the jacket 102 of the distribution cable 101 at the desired location for the connection station 110, 120, 140. A fiber is accessed at the window 107. The rear housing pieces 130, 131 are assembled around the distribution cable 101 at the window 107, thereby connecting the conductive cable members 106 to the electrical contacts at the power port 148. The accessed optical fiber is optically coupled to the fiber port 147 (e.g., by splicing, direct termination, etc.). The front housing 111, 121, 141 is mounted to the rear housing 112, 122, 142. A module 150, 160, 170, 180, 190 can be installed at the port 115, 125, 145 of the additional connection station 110, 120, 140.

FIGS. 18-19 illustrate an example connection station 140 having multiple ports. In the example shown, the connection station 140 has a fiber and power port 145 and has an additional fiber port 147. As noted above, the fiber and power port 145 includes a fiber port 147 and an electrical port 148. The additional fiber port 147 does not include a corresponding electrical port.

In other examples, however, the additional fiber port 147 could have a corresponding electrical port 148, resulting in a second fiber and power port 145. In still other examples, the additional port could be an electrical port instead of a fiber port.

In some implementations, the additional port(s) are disposed in the same recessed area 146 as the fiber and power port 145. In other implementations, one or more additional ports could be disposed in one or more separate recessed areas 146.

As shown in FIG. 19, one or more caps 149 can be mounted at the ports to protect the ports and/or the interior of the connection station 140. In certain examples, the caps 149 can be mounted side-by-side within a common recessed area 146.

Figure 20:
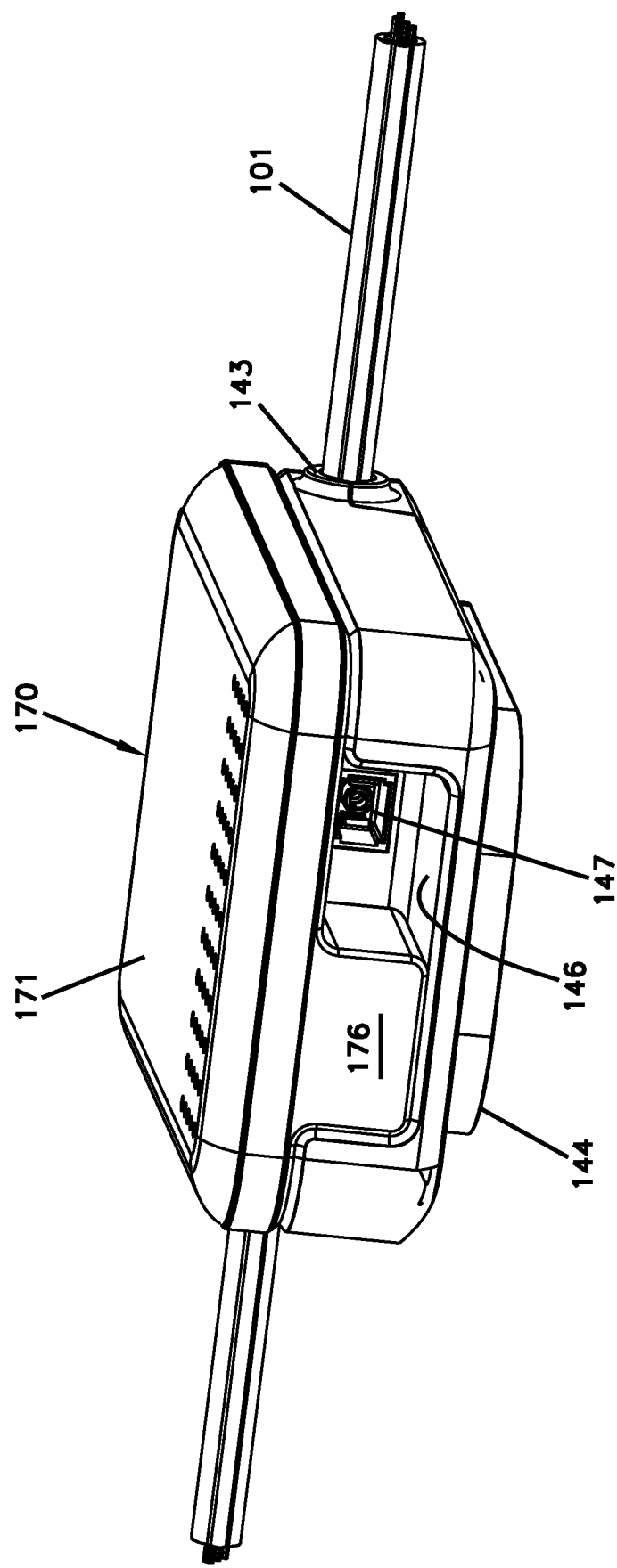
FIG. 20 shows an example wireless module installed at the connection station of FIG. 18, which has an additional port that is still accessible.

As shown in FIG. 20, the additional port 147 can remain accessible even after the wireless module 170 is installed at the connection station 140. Accordingly, an additional connection can be made to the distribution cable 101 via the additional port 147. Therefore, the connection station 140 can enable a direct, cabled connection to the optical signals carried by the cable 101 to one type of subscriber (e.g., a business, a security camera, etc.) while providing wireless connection to the optical signals to other subscribers in a ranged area surrounding the connection station 140.

Figure 21:
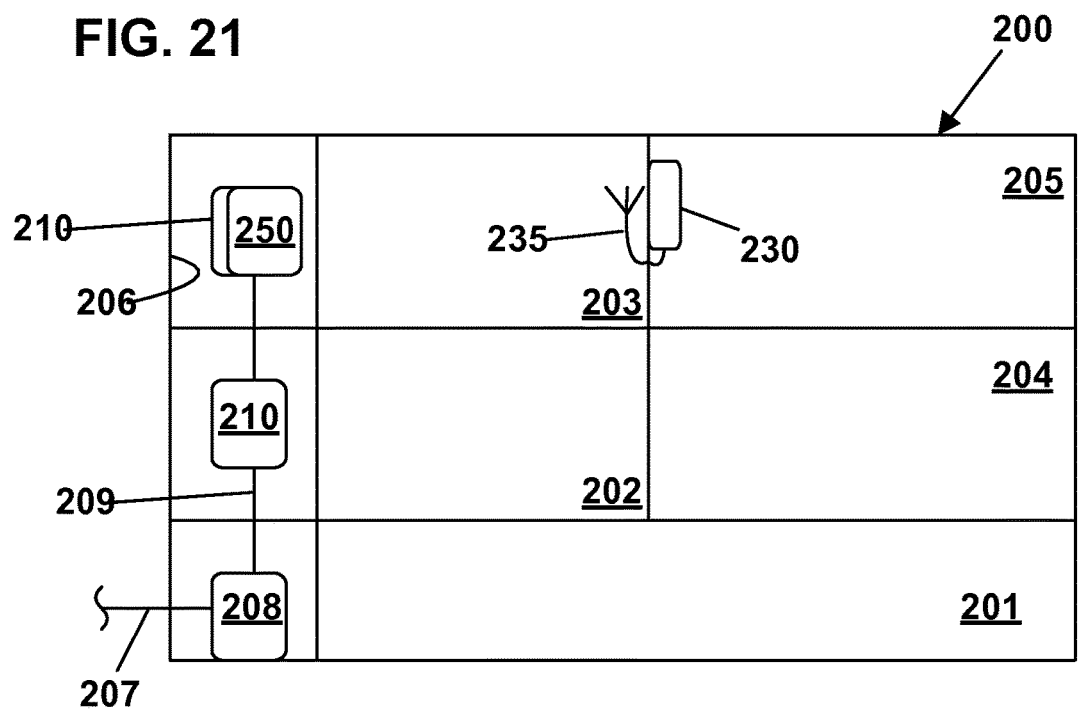
FIG. 21 illustrates the network utilized in a multi-story building to provide wireless signals to the various rooms without cabling into the rooms.
Figure 22:
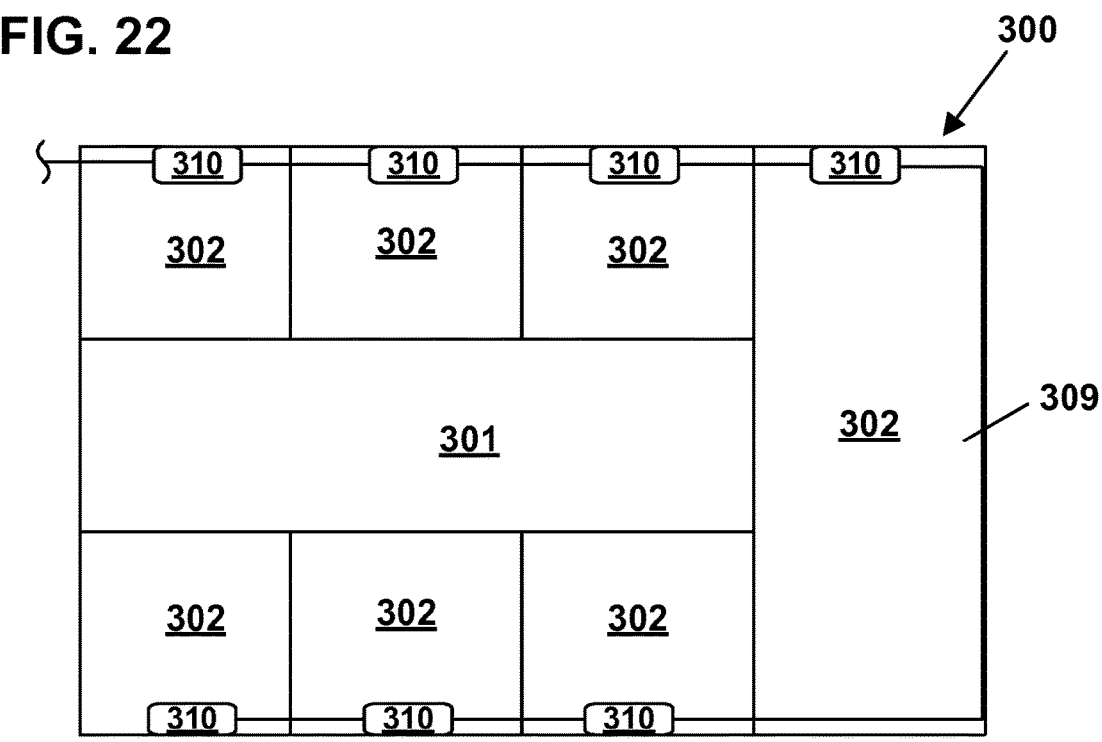
FIG. 22 illustrates the network utilized on a floor to provide wireless services, point-to-point services, security camera services along the floor.

FIGS. 21 and 22 illustrate how the network 100 can be installed in some example environments. FIG. 21 illustrates the network 100 utilized in a multi-story building (e.g., a multi-dwelling unit) to provide wireless signals to the various rooms without cabling into the rooms. FIG. 22 illustrates the network 100 utilized on a floor (e.g., a mall, an office, etc.) to provide wireless services, point-to-point services, security camera services along the floor.

FIG. 21 illustrates a multi-dwelling unit 200 or other building having a first or ground floor 201 at which a source 208 (e.g., a fiber distribution hub) receives an input cable 207. In some examples, power and data signals are supplied to the source 208 over the input cable 207. In other examples, data signals are supplied to the source 208 over the input cable 207 and a battery or other power source supplies power to the source 208. A riser cable 209 extends from the source 208 through the building 200 to the various floors 202, 203, etc. (e.g., along a duct 206). In an example, the riser cable 209 includes the distribution cable 101 described above.

One or more connection stations 210 are disposed at each floor 202, 203 along the riser cable 209. Any of the connection stations 110, 120, 140 described above are suitable for use as the connection station 210. In some implementations, the riser cable and connection stations 210 are initially installed. One or more modules 150, 160, 170, 180, 190 can be subsequently mounted to the connection stations 210 when service is desired. In certain implementations, one or more connection stations 210 can be added subsequent to the installation of the riser cable 209. In certain implementations, one or more modules 150, 160, 170, 180, 190 can be installed when the corresponding connection stations 210 are installed.

In the example shown, a wireless transceiver module 250 is installed at the connection station 210 on floor 203. A room 205 on floor 203 is associated with an antenna 235 configured to receive the signals broadcast by the wireless transceiver module 250. The antenna 235 is coupled (e.g., electrically coupled) to a distribution node 230 disposed within the room 205. In some examples, a subscriber can make cabled connections to the distribution node 230 to connect equipment within the room 205 to the signals carried by the riser 209 from the source 208.

Accordingly, neither the riser cable installer nor the module installer need have access to the room 205 to begin providing service to the subscriber within the room 205. In certain implementations, an antenna and distribution node can be pre-installed at each room 204, 205 and service is provided to the rooms 204, 205 by installing a wireless module 250 without accessing the rooms 204, 205.

FIG. 22 illustrates a floor 301 having multiple rooms 302 (e.g., stores, offices, etc.) at which various types of services may be provided. A distribution cable 309 can be routed around the floor 301. One or more connections stations 310 can be installed at the distribution cable 309. For example, one or more connection stations 310 can be installed at each room 302. The modules 150, 160, 170, 180, 190 mounted to the connections stations 310 are selected based on the type of service to be provided.

For example, a wireless transceiver module 150, 160, 170 can be provided at one or more connection stations 310 to provide a wireless network at select locations on the floor 301. In other examples, a point-to-point connection may be desired (e.g., by a business) within one or more of the rooms 302. Accordingly, such a connection may be made at the connection station 310, at the fiber port 147 of the wireless module 170, at a pass-through port of the splitter module 190, etc. In other examples, one or more security cameras may need to be installed within one or more of the rooms 302. The network including the distribution cable, the connection stations, and the various modules provides flexibility to grow the network as demand increases without recabling the network. The network including the distribution cable, the connection stations, and the various modules also enable customization of which services are provided at which locations without additional cabling.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An optical network comprising:
a distribution cable including a plurality of optical fibers carrying optical signals, the distribution cable also carrying power;
a plurality of connection stations disposed at intermediate locations along the distribution cable, each connection station defining first and second major surfaces connected by a peripheral edge so that the distribution cable passes through opposite sides of the peripheral edge, each connection station having a port that is optically coupled to one of the optical fibers within an interior of the respective connection station, thereby making the optical signals carried by the one of the optical fibers available at the port, each connection station also making the power carried by the distribution cable available at the respective port, each port being disposed at a recessed area of the respective connection station so that the port is accessible from an exterior of the respective connection station; and
a module configured to be mounted at the exterior of one of the connection stations, the module including a housing carrying a connection arrangement that protrudes from the housing and mates with the port of the connection station so that the connection arrangement is received in the recessed area, the module being configured so that a major surface of the module extends over the second major surface of the one of the connection stations and so that the module does not extend beyond a footprint of the peripheral edge of the one of the connection stations.

2. The optical network of claim 1, wherein the connection arrangement of the module is shaped and configured to slide towards the port when the module is installed at the connection station.

3. The optical network of claim 1, wherein the connection station has an additional port at which optical signals from the distribution cable can be accessed even when the module is installed at the connection station.

4. The optical network of claim 1, wherein the module is a wireless module configured to wirelessly broadcast the optical signals obtained from the port.

5. The optical network of claim 1, wherein the module is a video camera.

6. The optical network of claim 1, wherein the module is an optical splitter.

7. The optical network of claim 1, wherein each connection station includes first and second housing pieces between which a portion of the distribution cable is sandwiched.

8. The optical network of claim 7, wherein contact blades protrude from the first housing piece so that the contact blades automatically bite into the distribution cable and contact conductive members within the distribution cable when the connection station is assembled around the distribution cable.

9. The optical network of claim 1, further comprising a plurality of removable caps, each removable cap being installed at the port of a respective one of the connection stations prior to installing a respective module.

10. The optical network of claim 1, wherein each connection station includes a rear housing and a front housing that couple together to define the interior, the rear housing defining a passage through which the distribution cable extends; and wherein the port is defined by an adapter disposed within the interior.

11. The optical network of claim 10, wherein the rear housing includes an adapter holder that receives the adapter.

12. The optical network of claim 10, wherein the rear housing also defines a window along the passage to connect the passage to the interior, wherein the one of the optical fibers extends through the window into the interior.

13. The optical network of claim 12, wherein a connectorized end of the one of the optical fibers is plugged into an inner port of the adapter.

14. The optical network of claim 12, wherein the one of the optical fibers is spliced to a connectorized pigtail that is plugged into an inner port of the adapter.

15. The optical network of claim 10, further comprising a splice tray disposed within the interior.

16. The optical network of claim 10, wherein the passage extends between cable apertures disposed at opposite sides of the rear housing.

17. The optical network of claim 16, wherein the cable apertures are sealed.

18. The optical network of claim 10, wherein the rear housing defines the recessed area at which the port is disposed to be accessible from the exterior of the connection station.

19. The optical network of claim 1, wherein the first major surface carries mounting structure to mount the one of the connecting stations to a mounting surface.

* * * * *

UNITED STATES PATENT AND TRADEMARK OFFICE
CERTIFICATE OF CORRECTION

PATENT NO. : 11,249,267 B2
APPLICATION NO. : 16/349939
DATED : February 15, 2022
INVENTOR(S) : David Jan Irma Van Baelen It is certified that error appears in the above-identified patent and that said Letters Patent is hereby corrected as shown below:

In the Specification

Column 1, Line 10: "which is are" should read --which are--

Signed and Sealed this
Twenty-eighth Day of June, 2022

*Katherine Kelly Vidal*

Katherine Kelly Vidal
*Director of the United States Patent and Trademark Office*